United States Patent [19]
Hirai et al.

[11] Patent Number: 6,084,963
[45] Date of Patent: Jul. 4, 2000

[54] PHONE HOLDER FOR SELECTIVELY HOLDING A MOBILE PHONE

[75] Inventors: Hiroki Hirai; Nobuaki Kojima; Masashi Sugimoto; Shigeki Sakai; Yoshito Sakai; Tetsuji Tanaka; Yuichiro Tsutsumi, all of Nagoya, Japan

[73] Assignees: Harness System Technologies Research, Ltd., Nagoya; Sumitomo Wiring Systems, Ltd., Yokkaichi; Sumitomo Electric Industries, Ltd., Osaka, all of Japan

[21] Appl. No.: 08/961,031

[22] Filed: Oct. 30, 1997

[30] Foreign Application Priority Data

| Nov. 1, 1996 | [JP] | Japan | 8-291727 |
| Dec. 11, 1996 | [JP] | Japan | 8-331040 |
| Jan. 14, 1997 | [JP] | Japan | 9-004928 |
| Jun. 19, 1997 | [JP] | Japan | 9-162700 |

[51] Int. Cl.⁷ ................................................. H04M 1/00
[52] U.S. Cl. ........................................ 379/446; 379/455
[58] Field of Search .................. 379/446, 426, 379/455, 454, 449

[56] References Cited

U.S. PATENT DOCUMENTS 5,230,016  7/1993  Yasuda ................................ 379/455
5,535,274  7/1996  Braitberg et al. .................. 379/446

FOREIGN PATENT DOCUMENTS

| 722 858 | 7/1996 | European Pat. Off. |
| 91 06 515 | 8/1991 | Germany |
| 91 06 515 U | 8/1991 | Germany |
| 94 09 902 U | 10/1994 | Germany |
| 6-6299 | 1/1994 | Japan |

*Primary Examiner*—Jack Chiang
*Attorney, Agent, or Firm*—Oliff & Berridge, PLC

[57] ABSTRACT

A phone holder includes a single outer casing to which a holder connector is fixed and a plurality of types of inner casings selectively mountable into the outer casing. The inner surfaces of the respective inner casings are configured such that the corresponding mobile phones can be substantially closely fitted thereinto, and the positions thereof are set such that phone side connectors of the mobile phone are connectable with the holder connector in inserted states of the mobile phones. A connector provided phone holder can be commonly used for a plurality of types of mobile phones and to stably and easily detachably hold the respective mobile phones.

20 Claims, 29 Drawing Sheets

PHONE HOLDER FOR SELECTIVELY HOLDING A MOBILE PHONE

BACKGROUND OF THE INVENTION

This invention relates to a phone holder which is installed in an automotive vehicle or the like to hold a mobile phone.

With the spread of portable phones, phone holders which enable mobile phones to be used and held in automotive vehicles have been developed in recent years. A generally known phone holder as such is provided with a holder main body in the form of a frame or the like for holding a mobile phone and a holder connector mounted on the holder main body or a vehicle body via a curl cord or the like. In this phone holder, the mobile phone is connected with the holder connector; is positioned on the holder main body; and is held in this state by a locking device or the like.

With the prior art phone holder as above, it is not easy to position the mobile phone and the holder connector when connecting them. It is difficult for a driver to perform such an operation while he is driving a vehicle. Further, the mobile phone is not stably held and may, accordingly, come out of the holder due to vibrations produced during the driving.

As a means to overcome such an inconvenience, the holder main body may be formed such that the inner configuration thereof substantially conforms to the outer configuration of the mobile phone, so that the mobile phone can be closely fitted into the holder main body. In this way, the positioning of the mobile phone and the holder connector can be made easier and the mobile phone can be stably held.

However, with such a construction, only the mobile phones having the outer configuration in conformity with the inner configuration of the holder main body can be held. In the case that a plurality of types of mobile phones having different outer configurations and different arrangement positions of phone side connectors (for example, in the case that a plurality of persons having different mobile phones use a single automotive vehicle), as many phone holders as the types of the mobile phones must be prepared. Thus, the above phone holder can be used in a limited manner. Particularly, the holder connector secured to the holder connector is relatively expensive and, therefore, it is very uneconomical to prepare the holder connectors as many as the mobile phones.

Further, in the case of using a plurality of types of phone holders, it is considered to fix all holders side by side in a passenger compartment or to exchange the phone holder in conformity with the mobile phone in use. The former requires a large space to install all holders, whereas the latter requires very cumbersome installation and removal when the holders are exchanged.

SUMMARY OF THE INVENTION

It is an object of the present invention to provide a phone holder which has overcome the problems residing in the prior art.

According to an aspect of the present invention, a phone holder is adapted for selectively holding one of a plurality of types of mobile phones at least one of which has a different outer configuration and/or a phone side connector arranged in a different position. The phone holder comprises a holder connector connectable with a phone side connector of a mobile phone, and a holder casing. The holder casing includes an outer casing, and a plurality of types of inner casings corresponding to different mobile[ ]phones. Each inner casing is selectively and detachably fittable into the outer casing, and having such an inner configuration as to hold a corresponding mobile phone when the mobile phone is inserted thereinto. The position of an inner surface of each inner casing is set such that the phone side connector of the corresponding mobile phone is connectable with the holder connector in an inserted state of the mobile phone.

Accordingly, the inventive phone holder can be commonly used for a plurality of types of mobile phones having different outer configurations and a phone side connector in different arrangement positions while being installed in a passenger compartment of an automotive vehicle, and can detachably and stably hold the respective mobile phones.

These and other objects, features and advantages of the present invention will become more apparent upon a reading of the following detailed description and accompanying drawings.

BRIEF DESCRIPTION OF THE DRAWINGS

FIGS. 24A and 24B are diagrams showing the action of a phone locking device of the phone holder of FIG. 18, wherein FIG. 24A shows the phone locking device effecting locking as the mobile phone is accommodated and FIG. 24B shows the phone locking device effecting unlocking;

DETAILED DESCRIPTION OF THE PREFERRED EMBODIMENTS OF THE INVENTION

A first embodiment of the invention is described with reference to FIGS. 1 to 5.

A shown phone holder is commonly usable for a plurality of types of mobile phones 30A, 30B, 30C (three types shown in FIGS. 4A to 4C in this embodiment), and includes a single outer casing 10 and a plurality of types of inner casings 20A, 20B, 20C corresponding to the respective mobile phones 30A, 30B, 30C.

Figure 4A:
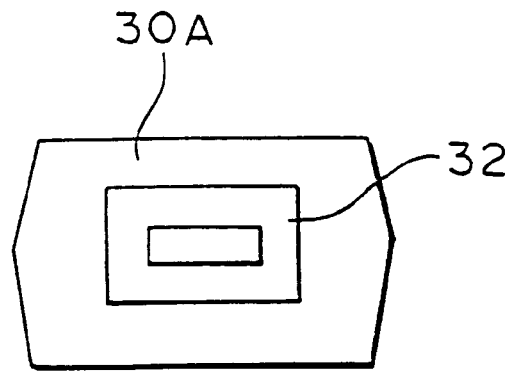
FIGS. 4A to 4C are bottom views of mobile phones for which the phone holder is commonly used.
Figure 4B:
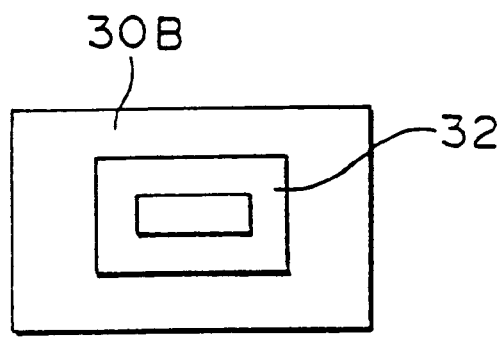
Figure 4C:
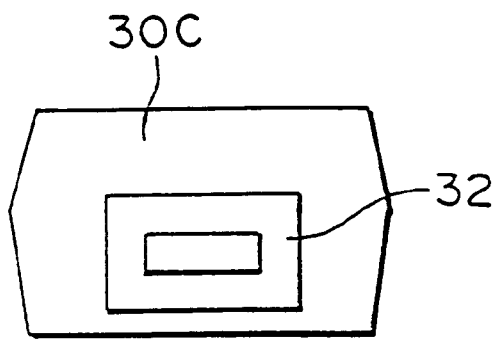
Figure 5A:
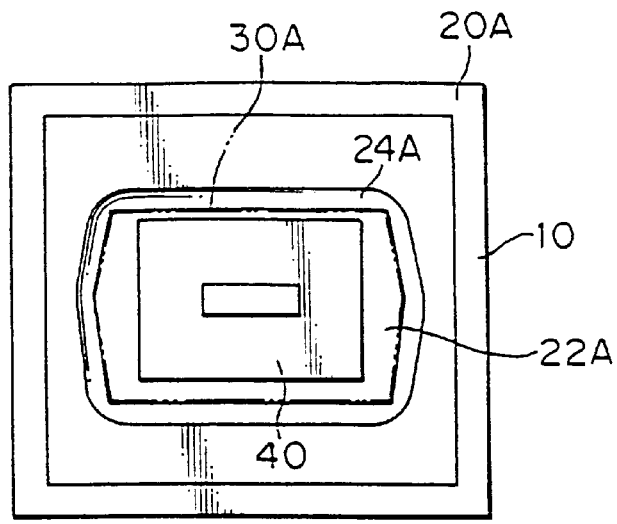
FIGS. 5A to 5C are plan views showing states where different inner casings are fitted into an outer casing of the phone holder.
Figure 5B:
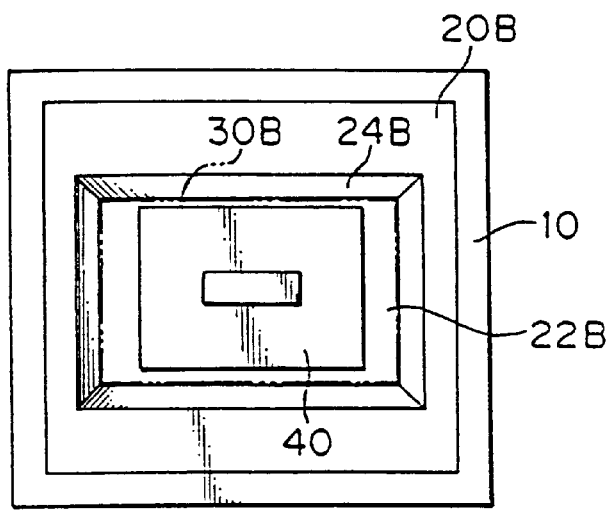
Figure 5C:
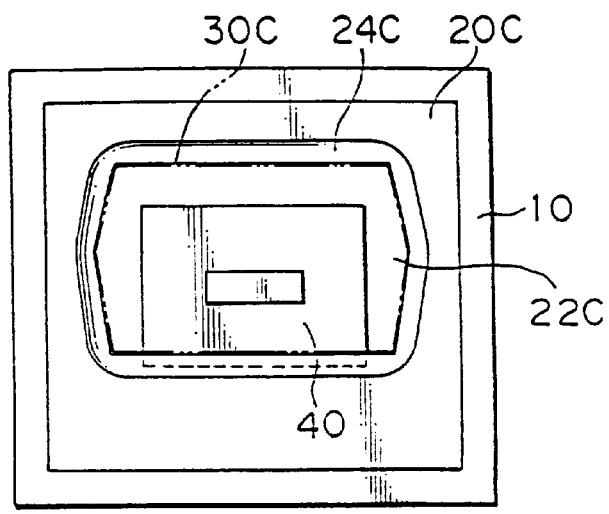

At the bottom ends of the respective mobile phones 30A, 30B, 30C, the same phone side connector 32 is provided a s shown in FIGS. 4A to 4C. The mobile phones 30A, 30B have different outer configurations (particularly plane configurations), and the mobile phones 30A, 30C have different connector arrangement positions.

It should be appreciated that the invention is also applicable to a case where all mobile phones to be used have mutually different outer configurations and a case where they have the same outer configuration, but different connector arrangement positions.

In this embodiment, the outer casing 10 has a substantially rectangular tubular shape having open ends with respect to its length. The outer casing 10 is secured to a specified position (e.g. in a passenger compartment of an automotive vehicle) with its length along vertical direction, and a holder connector 40 connectable with the phone side connector 32 is fixed at the bottom end of the outer casing 10. Specifically, tubular nut portions 42 perforated with, threaded holes opening sideways are formed on side surfaces (four side surfaces in the shown example) of the holder connector 40. On the other hand, through holes 12 are formed in the respective side walls of the outer casing 10 in positions corresponding to the respective nut portions 42. The holder connector 40 is fixed by inserting bolts 14 into the through holes 12 from outside and screwing them into the nut portions 14 until the heads thereof come into contact with the outer surface of the outer casing 10.

It should be noted that a construction for securing the holder connector to the outer casing is not specified according to the invention.

Figure 1:
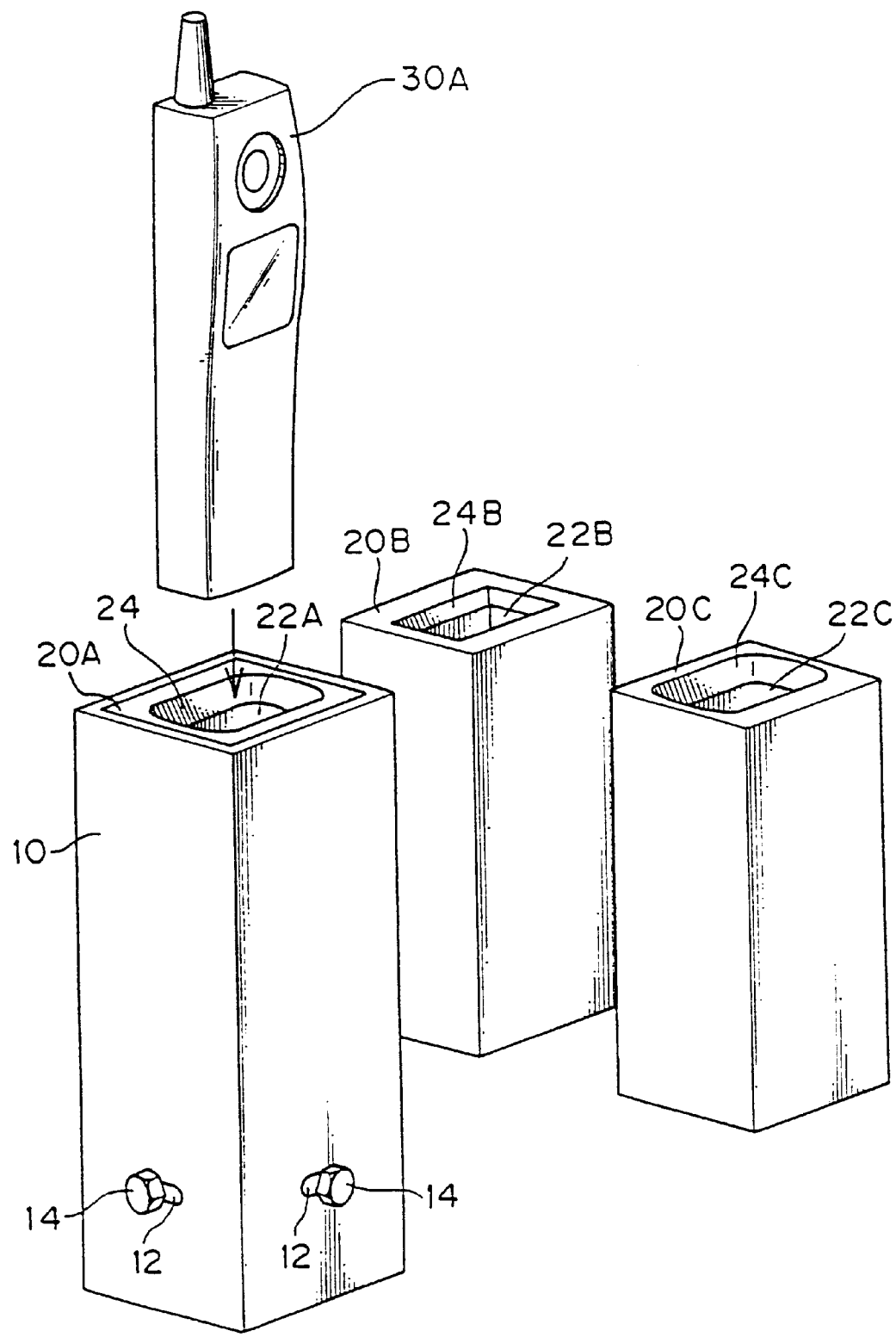
FIG. 1 is a perspective view of a phone holder according to a first embodiment of the invention before a mobile phone is inserted into an inner casing.
Figure 2:
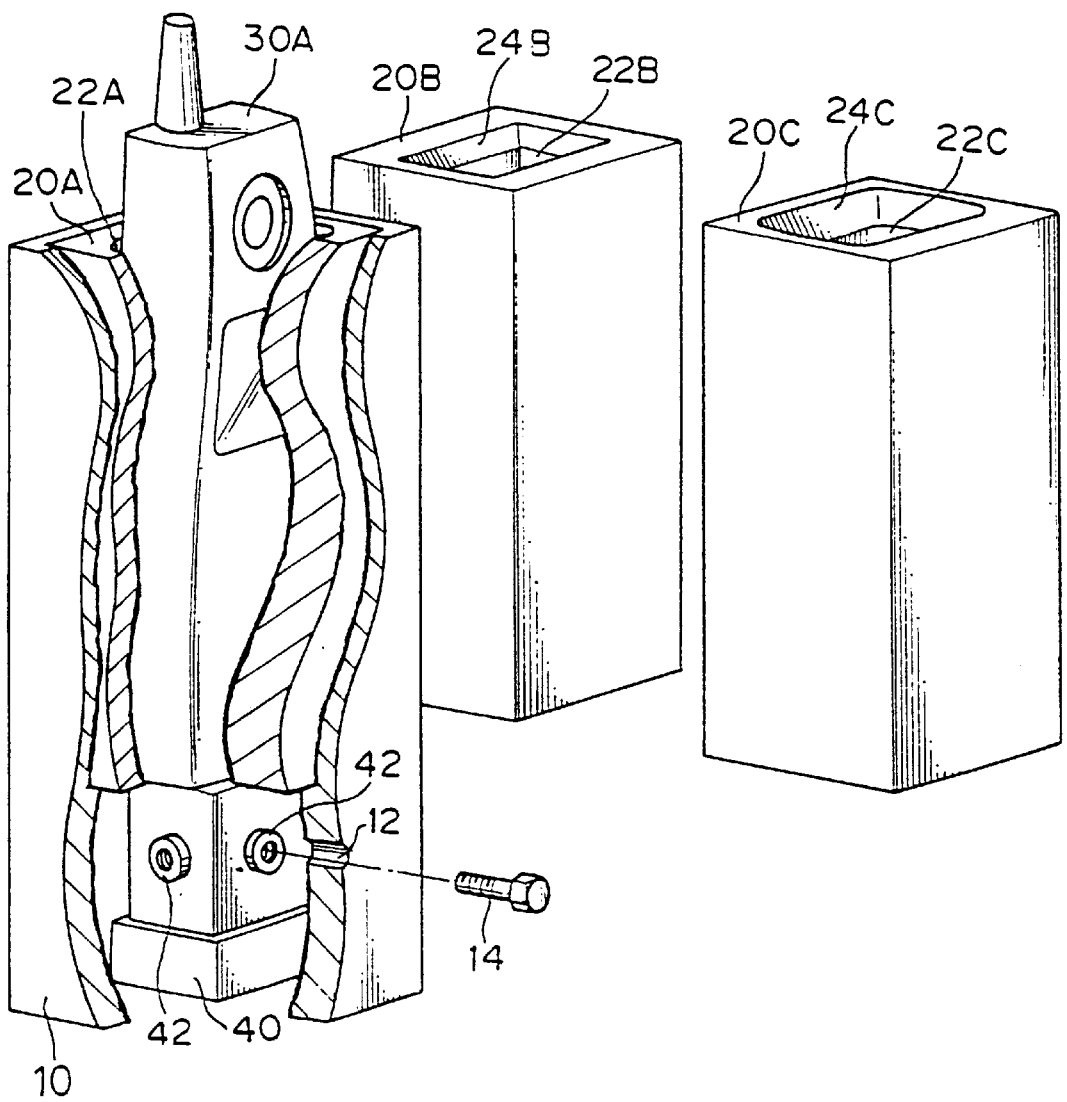
FIG. 2 is a perspective view partly in section of the phone holder with the mobile phone inserted in the inner casing.
Figure 3:
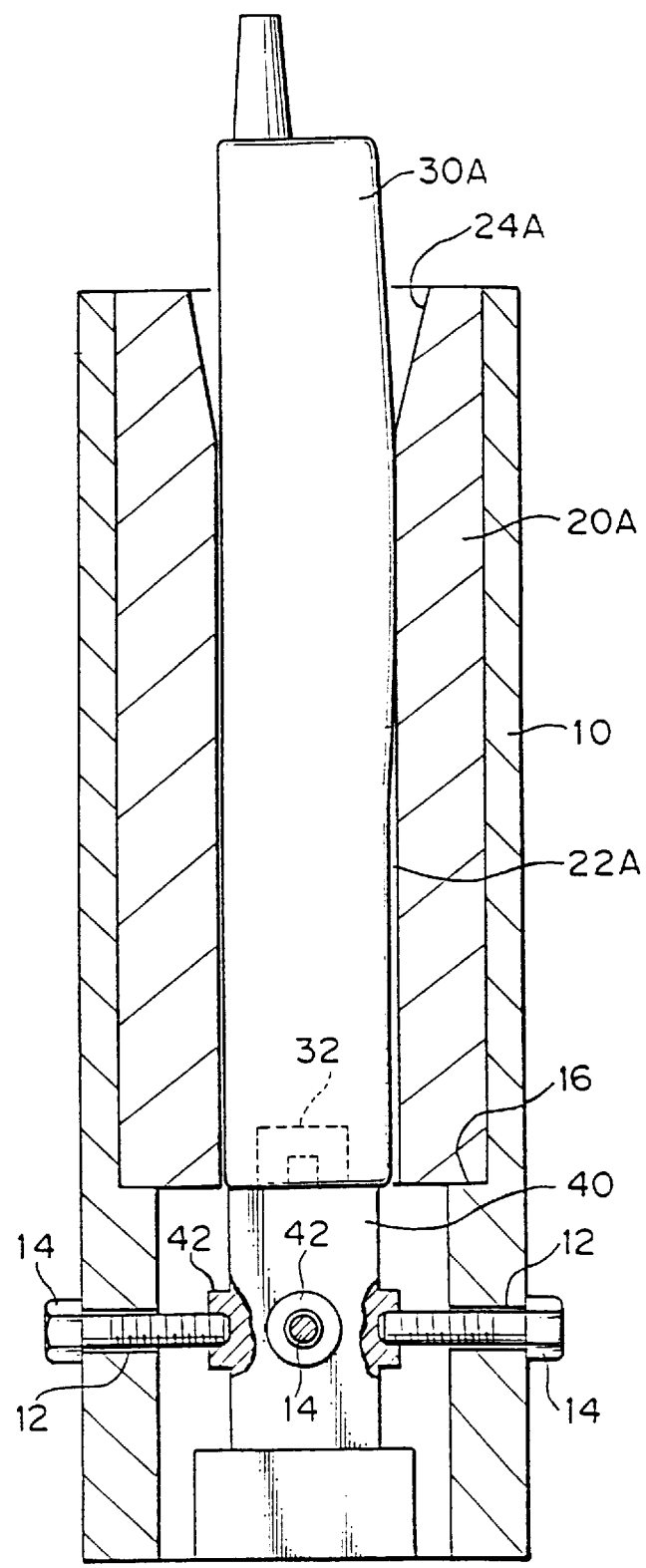
FIG. 3 is a front view in section of the phone holder with the mobile phone inserted in the inner casing.

The outer configurations of the respective inner casings 20A, 20B, 20C are so defined as to be fittable into the outer casing 10 from above (rectangular shape in the shown example), so that the inner casings 20A to 20C can be selectively fitted into the outer casing 10. As shown in FIG. 3, a stepped portion 16 is formed on the inner side surfaces of the outer casing 10 substantially at the same height as the upper surface of the holder connector 40. The length of the inner casings 20A to 20C are set such that the upper surface of the inner casing is substantially in flush with that of the outer casing 10 with any one of the inner casings 20A to 20C inserted until it comes into contact with the stepped portion 16 (mount state).

The inner casings 20A, 20B, 20C are formed with mobile phone insertion spaces 22A, 22B, 22C, respectively, which are hollow spaces vertically extending throughout the inner casings 20A, 20B, 20C. The plane configurations of the respective insertion spaces 22A to 22C (i.e. the inner configurations of the inner casings 20A to 20C) are defined such that the corresponding mobile phones 30A, 30B, 30C can be closely fitted thereinto. The positions of the insertion spaces 22A, 22B, 22C are set such that the phone side connector 32 is automatically connectable with the holder connector 40 of the outer casing 10 when the mobile phone 30A, 30B or 30C is inserted into the corresponding insertion space.

Specifically, as is clear from a comparison of FIGS. 4A to 4C and FIGS. 5A to 5C, the inner configurations of the inner casings 20A, 20B, 20C when viewed from above (the plane configurations of the mobile phone insertion spaces 22A, 22B, 22C) are substantially same as the outer configurations of the mobile phones 30A, 30B, 30C when viewed from above. Further, degrees of eccentricity of the insertion spaces 22A, 22B, 22C in the respective inner casings 20A, 20B, 20C are so set as to correspond to those of the connector arrangement positions in the respective mobile phones 30A, 30B, 30C.

At the entrances of the respective insertion spaces 22A, 22B, 22C, there are formed outwardly widening tapered surfaces 24A, 24B, 24C which facilitate the insertion of the mobile phones 30A. 30B, 30C, respectively.

Next, how this phone holder is used is summarily described.

① The outer casing 10 is vertically fixed in a passenger compartment of an automotive vehicle or the like with the holder connector 40 fixed at the bottom thereof. The orientation of the installed outer casing may be suitably set according to an installation position and an installation state. For example, the outer casing 10 may be fixed such that its opening faces forward (i.e. with its length along horizontal direction).

② One inner casing corresponding to the mobile phone to be used is selected from the inner casings 20A to 20C, and is fitted into the outer casing 10. In the example shown in FIGS. 1 to 3, the inner casing 20A is fitted into the outer casing 10 in order to use the mobile phone 30A.

③ The mobile phone 30A is inserted into the insertion space 22A of the inner casing 20A from above. Since the configuration and position of the insertion space 22A are set in conformity with the outer configuration of the mobile phone 30A and the arrangement position of the phone side connector 32, the phone side connector 32 and the holder connector 40 can be easily connected only by the insertion operation without necessitating particular positioning (state of FIGS. 2 and 3). In this mount state, since the mobile phone 30A is closely fitted in the inner casing 20A, the mobile phone 30A can be very stably held.

④ If, for example, the mobile phone 30B is desired to be used instead of the mobile phone 30A, the inner casing 20A is removed from the outer casing 10 and the inner casing 20B is inserted into the outer casing 10. By inserting the mobile phone 30B into the insertion space 22B of the inner casing 20B in this state, the phone side connector 32 of the mobile phone 30B and the holder connector 40 can be easily connected.

In other words, this phone holder can be commonly used for a plurality of types of mobile phones 30A to 30C by inserting and removing the inner casings 20A to 20C into and from the outer casing 10 with the outer casing 10 installed in the passenger compartment of the vehicle or the like.

Figure 6:
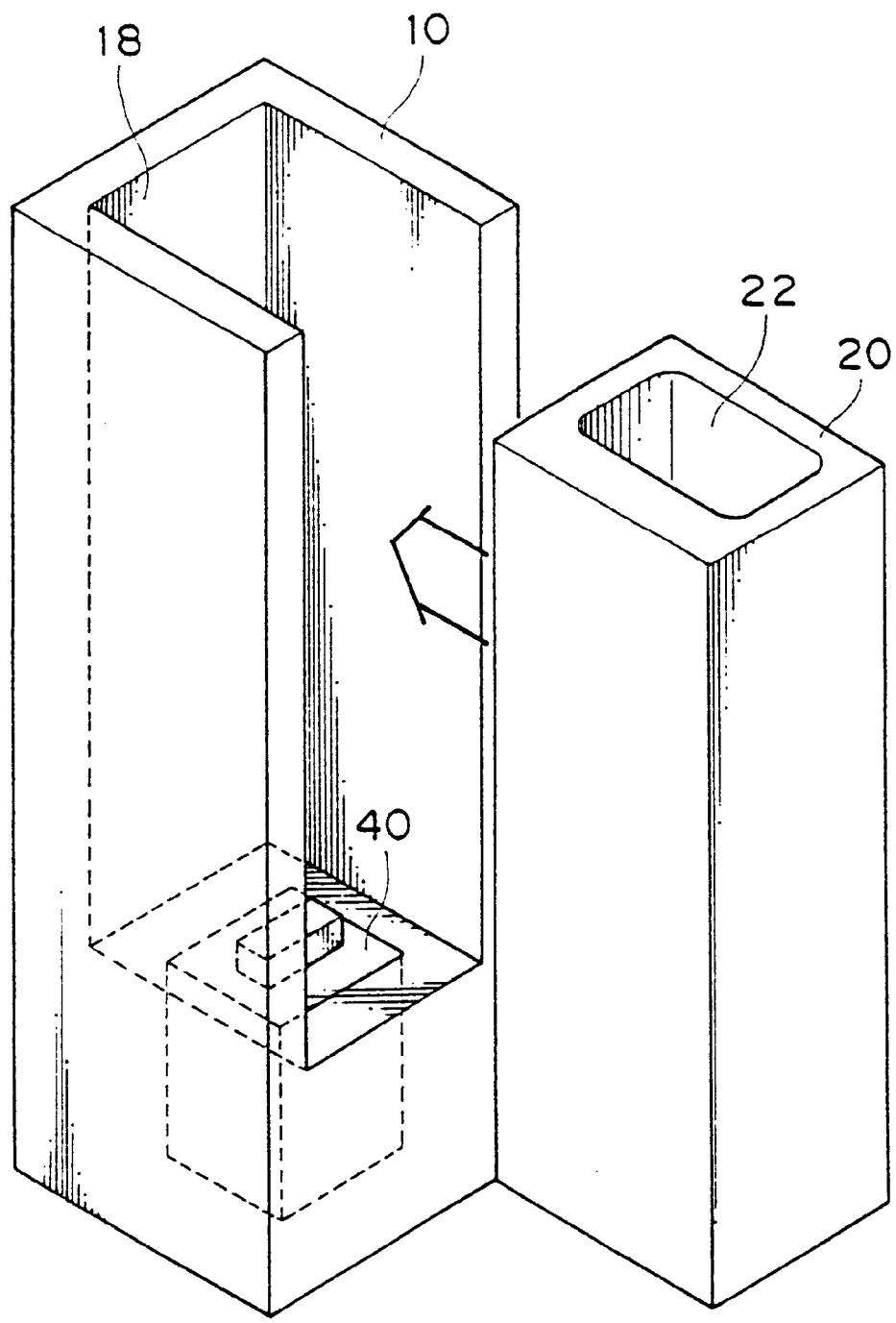
FIG. 6 is a perspective view of a phone holder according to a second embodiment of the invention.
Figure 7:
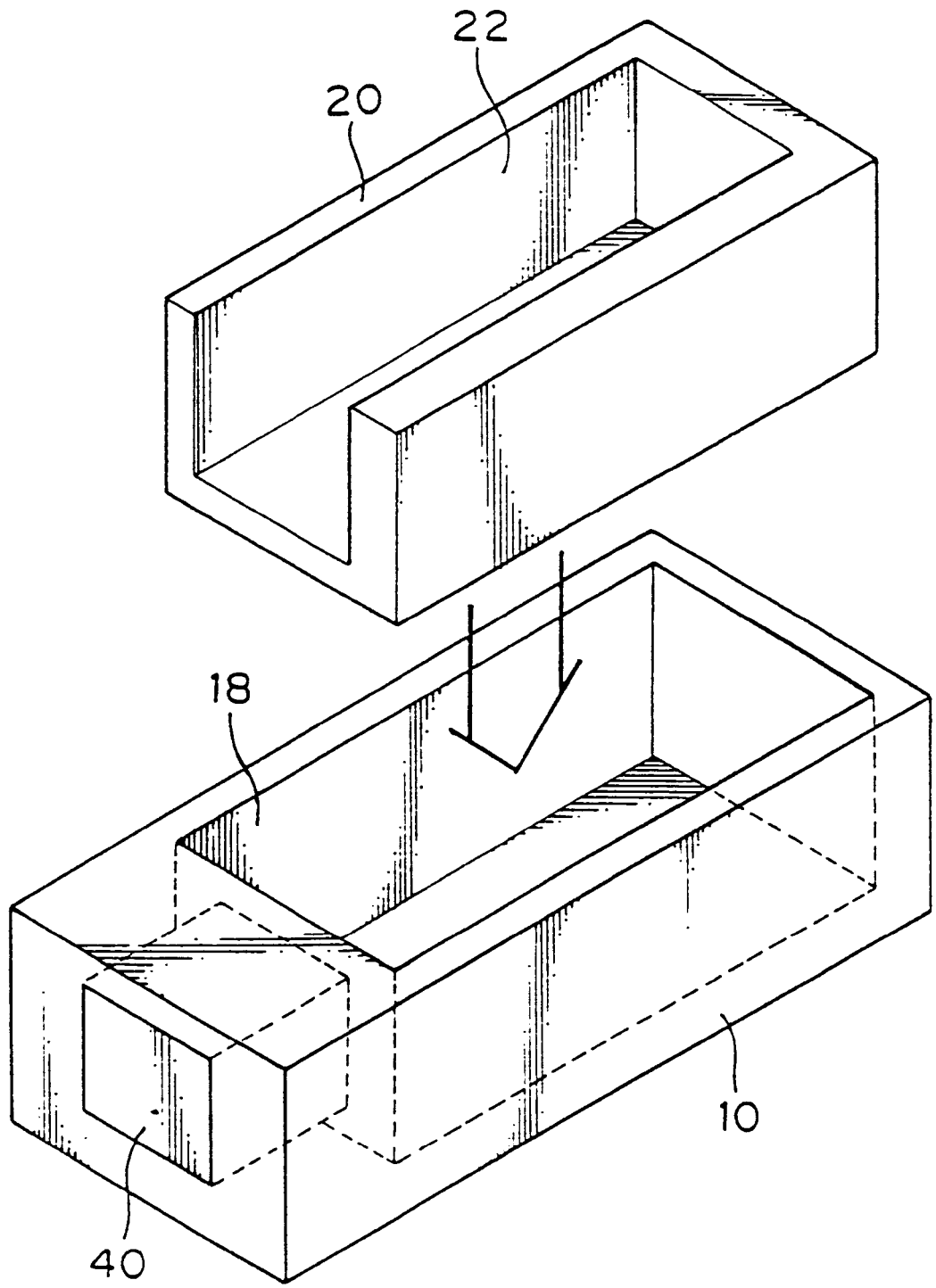
FIG. 7 is a perspective view of a phone holder according to a third embodiment of the invention.

According to the invention, the construction for mounting the inner casings into the outer casing and the insertion direction of the mobile phone into the inner casings may be suitably set. For example, the outer casing 10 may be formed with an inner casing insertion space 18 which is open sideways as shown as a second embodiment in FIG. 6, and the inner casing 20 having a vertically extending mobile phone insertion space 22 may be inserted into the insertion space 18 sideways. Alternatively, in a horizontal phone holder into which the horizontally oriented mobile phone is inserted from above, the outer casing 10 may be formed with a laterally long inner casing insertion space 18 which is open upward as shown as a third embodiment in FIG. 7, and the holder connector 40 may be fixed right at the side of the insertion space 18. An inner casing 20 having a mobile phone insertion space 22 which is open toward the holder connector 40 and upward is inserted into the insertion space 18 from above while being horizontally oriented. In this case, the phone side connector of the mobile phone and the holder connector 40 may be connected by sliding the mobile phone toward the holder connector 40 along the inner surface of the inner casing 20 after the insertion of the horizontally oriented mobile phone into the insertion space 22 from above.

However, if the inner casings 20A to 20C are configured such that the mobile phones 30A to 30C are insertable along their lengths; the outer casings 30A to 30C are configured such that the inner casings 20A to 20C are insertable along the lengths of the mobile phones; and the holder connector 40 is fixed at the bottom end with respect to the insertion direction as in the first embodiment, there can be obtained advantages of stably holding the mobile phone by the inner casing and of stably mounting the inner casing in the outer casing. Further, this construction has a good operability because the insertion of the inner casing into the outer casing and the insertion of the mobile phone into the inner casing are performed in the same direction.

The mobile phones 30A to 30C are closely inserted into the inner casings 20A to 20C over their entire lengths in the first embodiment. However, according to the invention, the outer surface of the mobile phone and the inner surface of the inner casing may be partly spaced provided that the mobile phone can be stably held by the above insertion.

Figure 8:
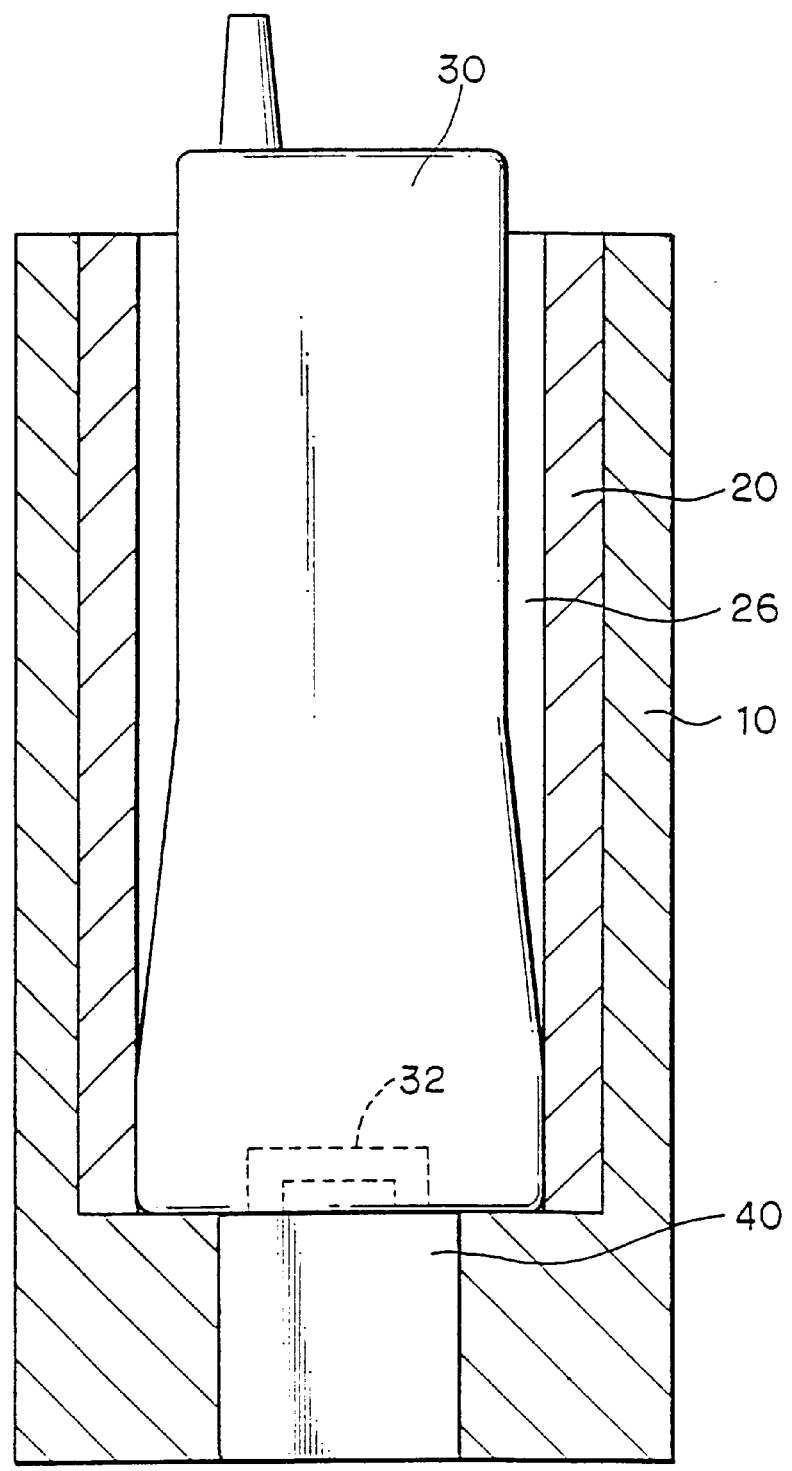
FIG. 8 is a perspective view of a phone holder according to a fourth embodiment of the invention.
Figure 9:
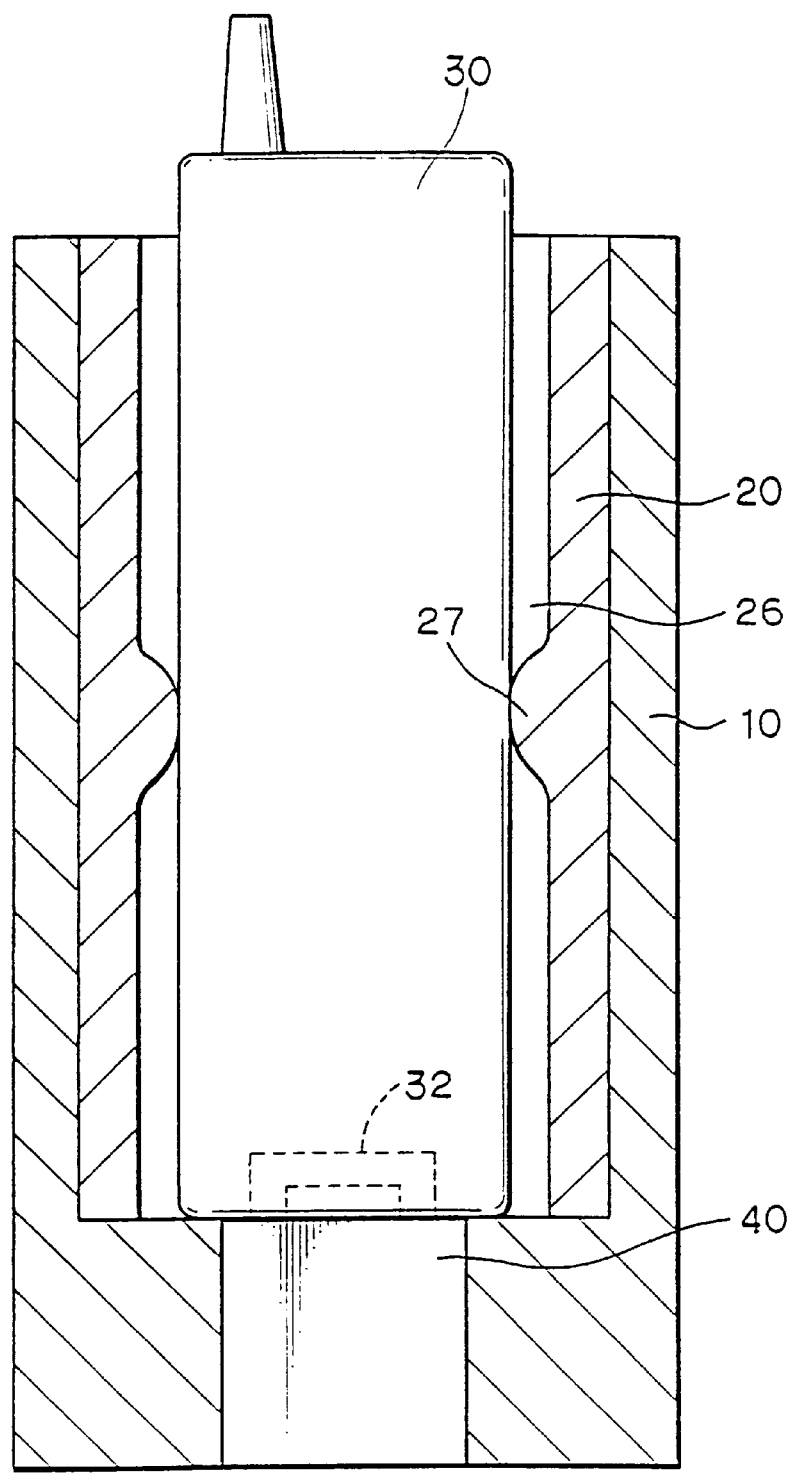
FIG. 9 is a perspective view of a phone holder according to a fifth embodiment of the invention.

For example, in a fourth embodiment shown in FIG. 8, the inner configuration of the inner casing 20 is such that its width is uniform over the entire length along the insertion direction (vertical direction in FIG. 8) of the mobile phone 30. On the other hand, the configuration of the mobile phone 30 is such that its bottom end cross section is larger than its upper part cross section. Accordingly, the bottom end of the mobile phone 30 is closely fitted in the inner casing 20, but a relatively large clearance 26 is left between the outer surface of the upper part of the mobile phone 30 and the inner surface of the upper part of the inner casing 20. However, there is no problem provided that the mobile phone 30 is stably held in the inner casing 20 by the close fitting of the bottom end of the mobile phone 30 in the inner casing 20. Further, as shown as a fifth embodiment in FIG. 9, a bulging portion 27 bulging inward may be formed in a specified position of the inner surface of the inner casing 20. The mobile phone 30 may be closely fitted only at the bulging portion 27 (i.e. clearance 26 is left in areas except the bulging portion 27).

Even in the case that the mobile phone 30 is locally closely fitted in the inner casing 20 as in the fourth and fifth embodiments, it is more preferable to set the engaging position as close as to the holder connector 40. This brings about an advantage of more smoothly guiding the mobile phone 30 to the holder connector 40.

According to the invention, the number of the inner casings used for the single outer casings is not limited, but may be suitably set according to the types of mobile phones. For example, the number of the inner casings may be 2, or 4 or more.

A sixth embodiment of the invention is described with reference to FIGS. 10 to 17.

As described above, the generally known phone holder to be installed in an automotive vehicle includes the holder main body in the form of, e.g. a frame which is cap able of fixing the mobile phone and the connector mounted on the holder main body or a vehicle body via a curl cord. This construction requires operations of fixing the mobile phone to the holder main body and of connecting the mobile phone with the connector to be individually performed.

Further, Japanese Unexamined Patent Publication No. 6-6299 discloses a phone holder in which a phone setting portion in which a mobile phone is set from above is provided on the upper surface of a holder main body; a connector mount portion including a circular rotary hook, pin or button for fixing and releasing a connector is provided before the phone setting portion; and the mobile phone is connected with the connector by setting the mobile phone in the phone setting portion from above after the connector is fixed to the connector mount portion and by moving the mobile phone forward along the phone setting portion.

However, with the general construction of such a known phone holder, it is not easy to fix the mobile phone to the holder main body while positioning it, and this operation needs to be performed separately from an operation of connecting the connector with the mobile phone. Thus, the operations of fixing the mobile phone and of connecting the mobile phone with the connector become cumbersome and, therefore, it is difficult for a driver to perform these operations while driving a vehicle. Further, if the mobile phone is unstably fixed, it may undesirable come out of the phone holder due to vibrations during driving.

Further, with the construction disclosed in the above publication as well, the operations of fixing the mobile phone in the phone setting portion while positioning it and of connecting the mobile phone with the connector by moving it need to be successively performed. It is not easy that a driver perform such operations while driving.

Accordingly, this embodiment seeks to remarkably simplify operations of fixing the mobile phone and of connecting the mobile phone with the connector so that a driver can perform these operations even while doing something else and also to secure the fixing of the mobile phone.

Figure 10:
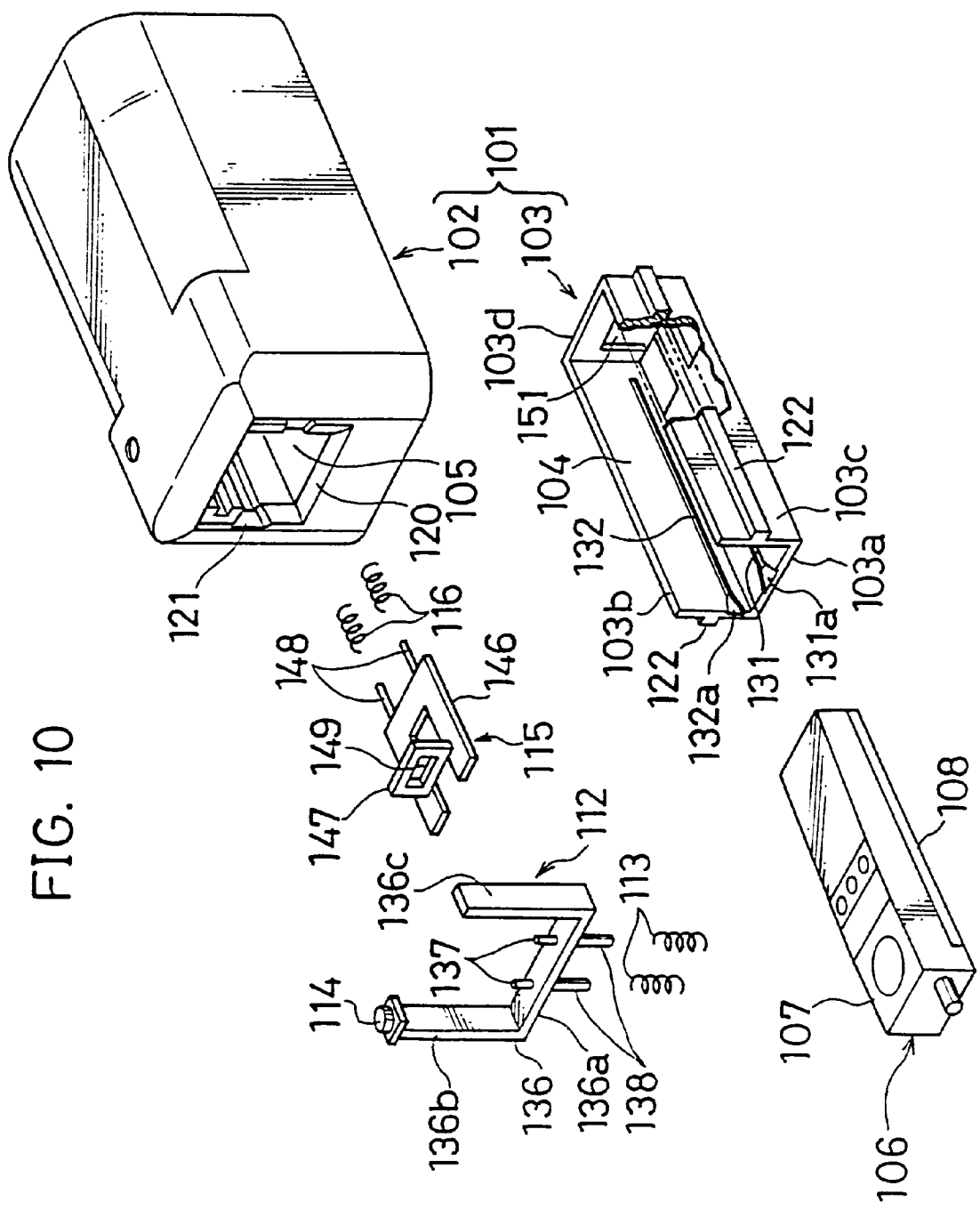
FIG. 10 is an exploded perspective view of a phone holder according to a sixth embodiment of the invention and a mobile phone.

FIG. 10 is an exploded view of a phone holder according to the sixth embodiment. In FIG. 10, identified by 101 is a holder main body which includes an outer casing 102 and an inner casing 103. The holder main body 101 includes a hollow phone accommodating portion 104 which is open in one end of the holder main body 101. A mobile phone 106 is detachably insertable into the phone accommodating portion 104. Further, the holder main body 101 can be used for a variety of types of mobile phones 106 having, for example, different sizes by exchanging the inner casing 103 according to the type of the mobile phone 106 to be accommodated.

Specifically, the outer casing 102 is in the form of a laterally long rectangular column having a hollow portion 105 which is open in one end. The hollow portion 105 is so formed as to be larger than a variety of mobile phones 106 to be used. Further, the inner casing 103 is in the form of a frame including a bottom plate 103a, opposite side walls 103b, 103c and a back wall 103d, and is fitted into the hollow portion 105 of the outer casing 102. A plurality of types of inner casings 103 having, for example, differently sized inner spaces are prepared in advance so as to conform to a variety of mobile phones 106 to be used. The selected inner casing 103 is fitted into the hollow portion 105 of the outer casing 102 to form the phone accommodating portion 104 corresponding to the mobile phone 106 to be accommodated.

Figure 11:
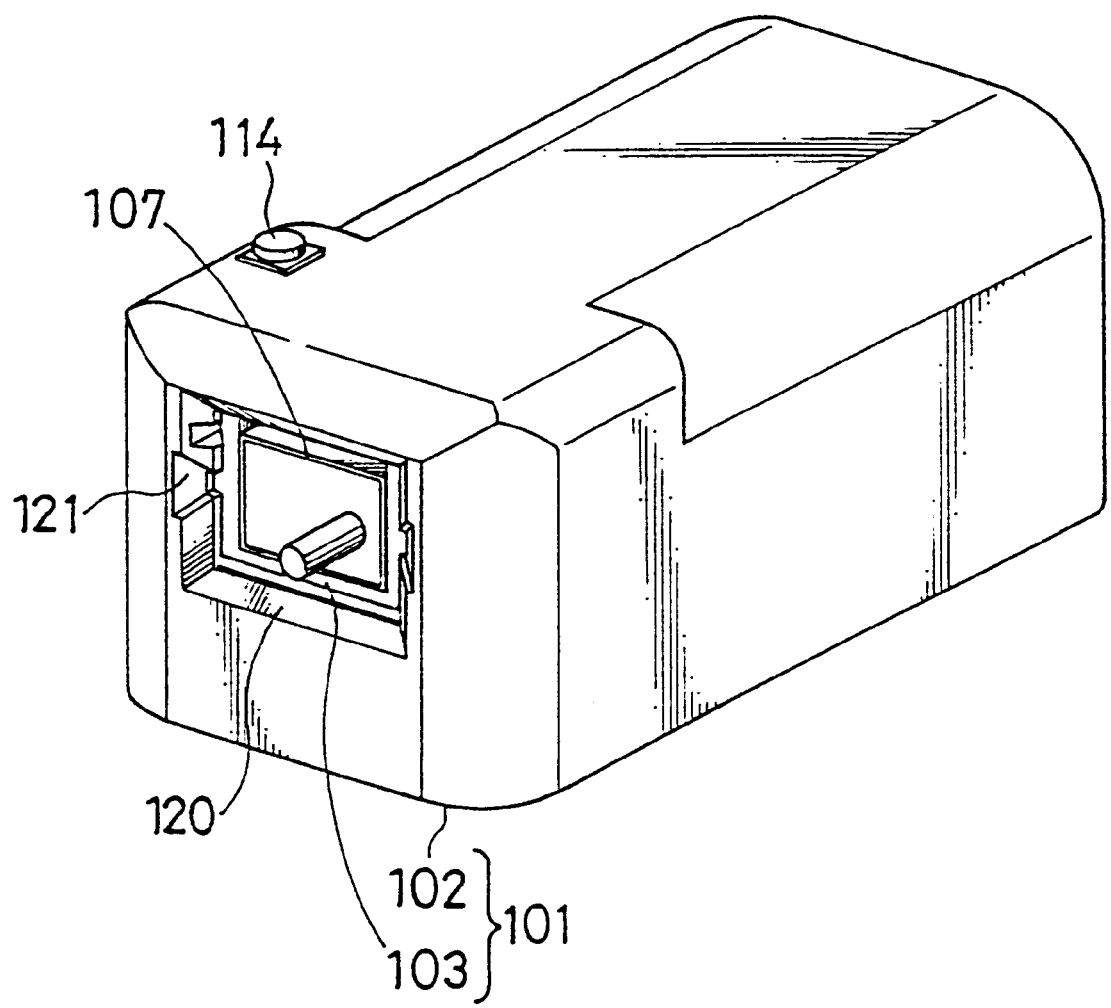
FIG. 11 is a perspective view of the assembled phone holder of FIG. 10 accommodating the mobile phone.

The holder main body 101 is provided with a connector 111 (see FIG. 14) to be described later, a lock member 112 for locking the mobile phone in a specified accommodation position, a spring 113 for biasing the lock member 112 to a locking position, an operable portion 114 integrally provided on the lock member 112, a push member 115 for pushing the mobile phone 106 in a withdrawal direction from the specified accommodation position when unlocking is effected, and a spring 116 for biasing the push member 115 forward. The lock member 112, the spring 113, the push member 115, the spring 116, etc. are assembled into the outer casing 102. The phone holder is assembled by fitting the inner casing 103 into the outer casing 102. In this state, the mobile phone 106 can be accommodated in the phone holder as shown in FIG. 11.

The mobile phone 106 includes a phone main body 107 and a battery 108 mounted on its lower surface. A phone side connector 109 is provided at a rear end of the phone main body 107.

The specific construction of each element of the phone holder is described in detail with reference also to FIGS. 12 to 17.

At the opening edge of the phone accommodating portion 104 of the holder main body 101 is provided a tapered portion 120 for facilitating the insertion of the mobile phone 106. In an intermediate position of each of the opposite inner side surfaces of the outer casing 102 with respect to its height direction is formed a guide groove 121 which extends backward from a position in vicinity of the opening edge. On the other hand, an elongated projection 122 corresponding to the guide groove 121 is provided on each of the opposite outer surfaces of the inner casing 103. The inner casing 103 is inserted into the hollow portion 105 of the outer casing 102 with the guide grooves 121 and the projections 122 engaged with each other.

Figure 12:
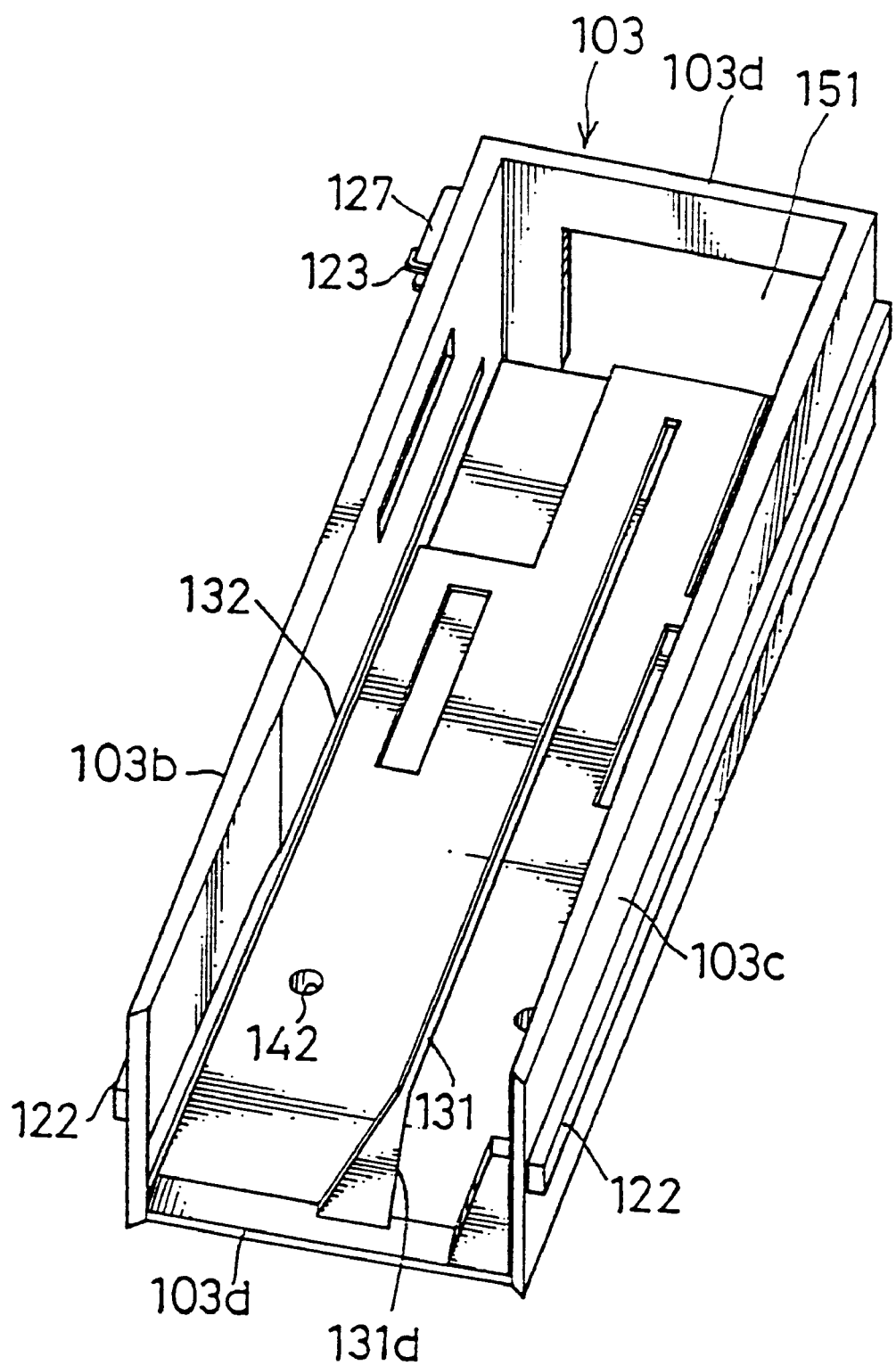
FIG. 12 is a perspective view of an inner casing of the phone holder of FIG. 10.
Figure 13:
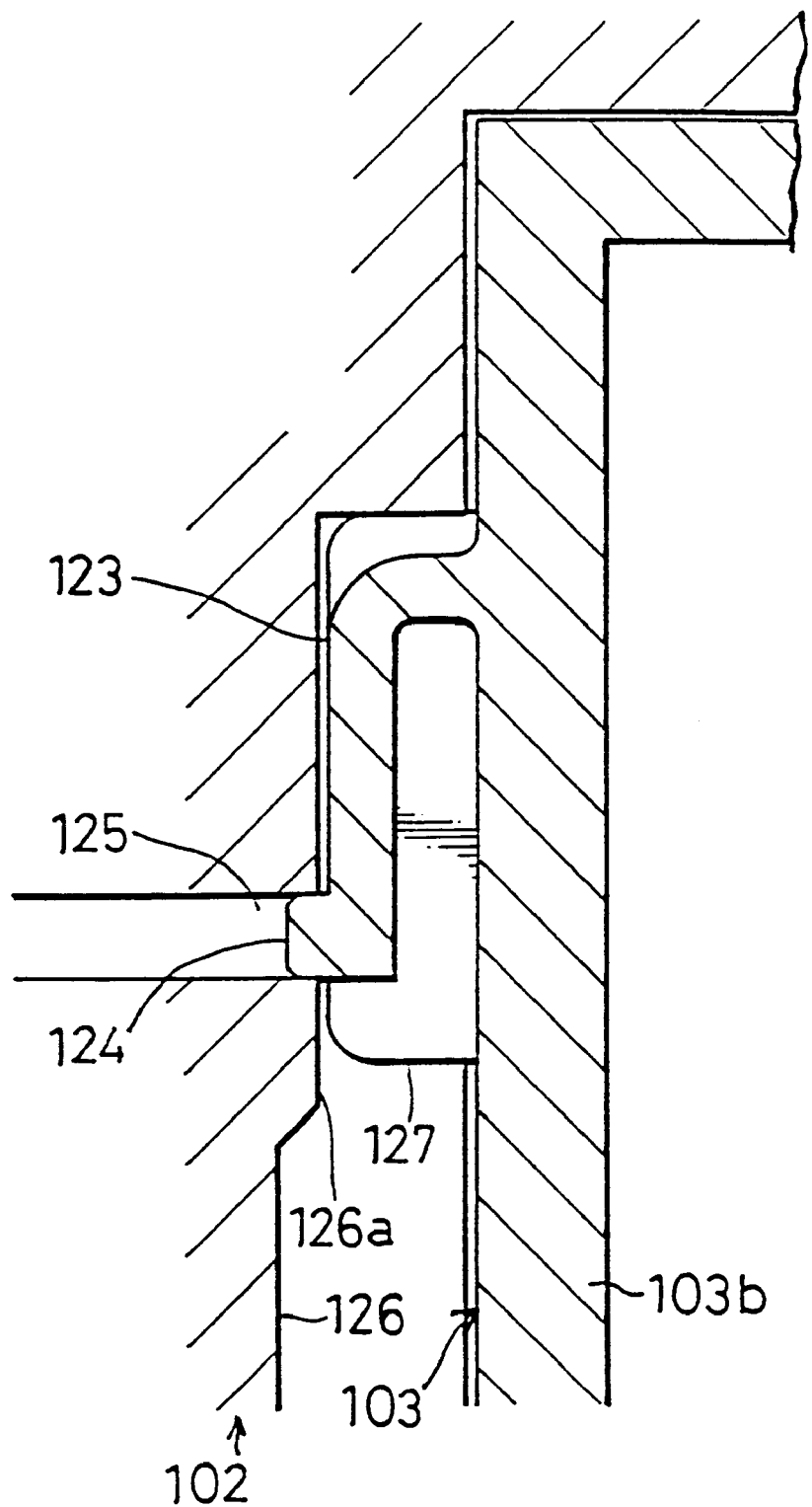
FIG. 13 is a section of an engaging portion of the outer and inner casings of the phone holder of FIG. 10.
Figure 14:
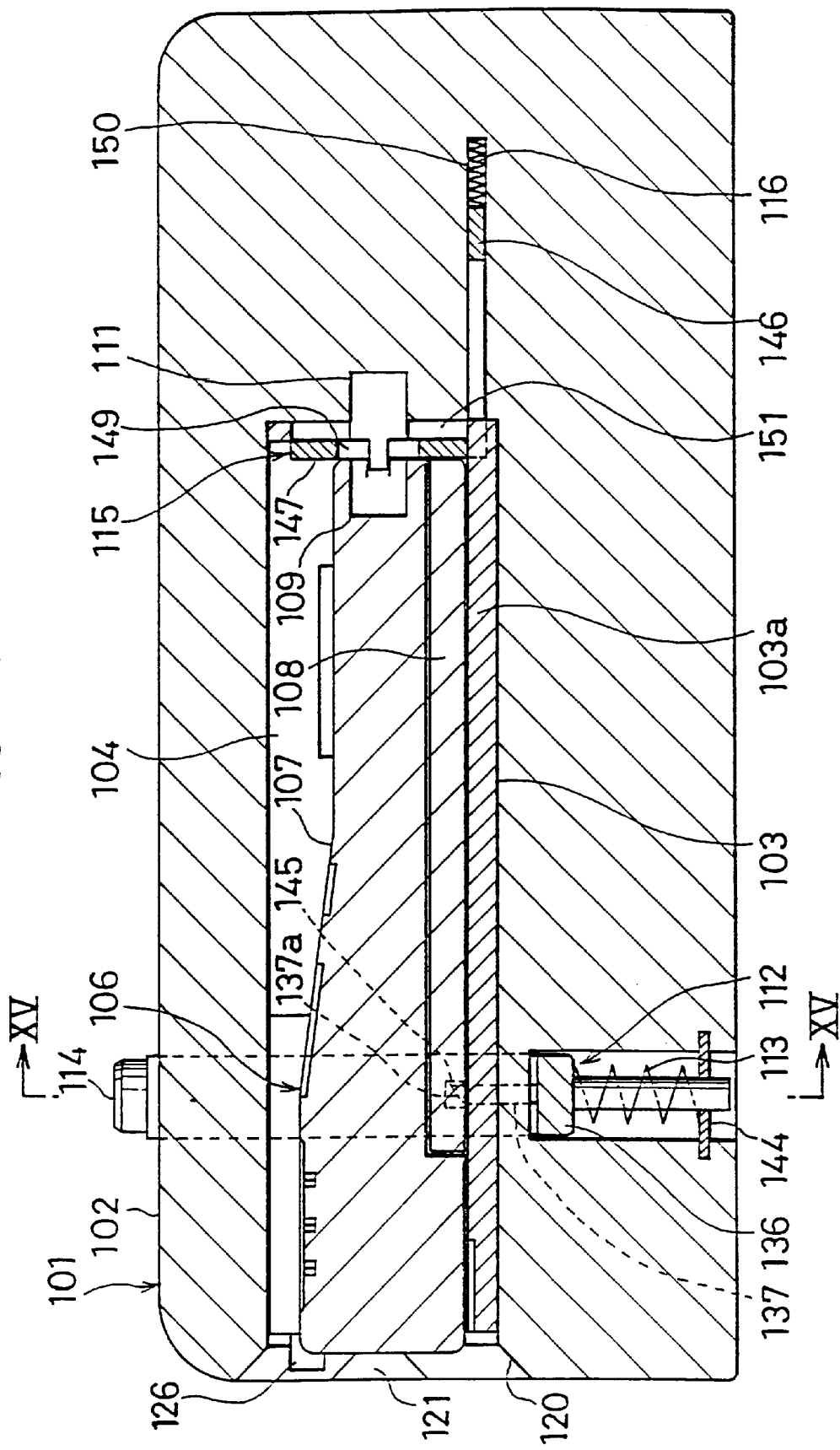
FIG. 14 is a side view in vertical section of the phone holder of FIG. 10 accommodating the mobile phone.
Figure 15:
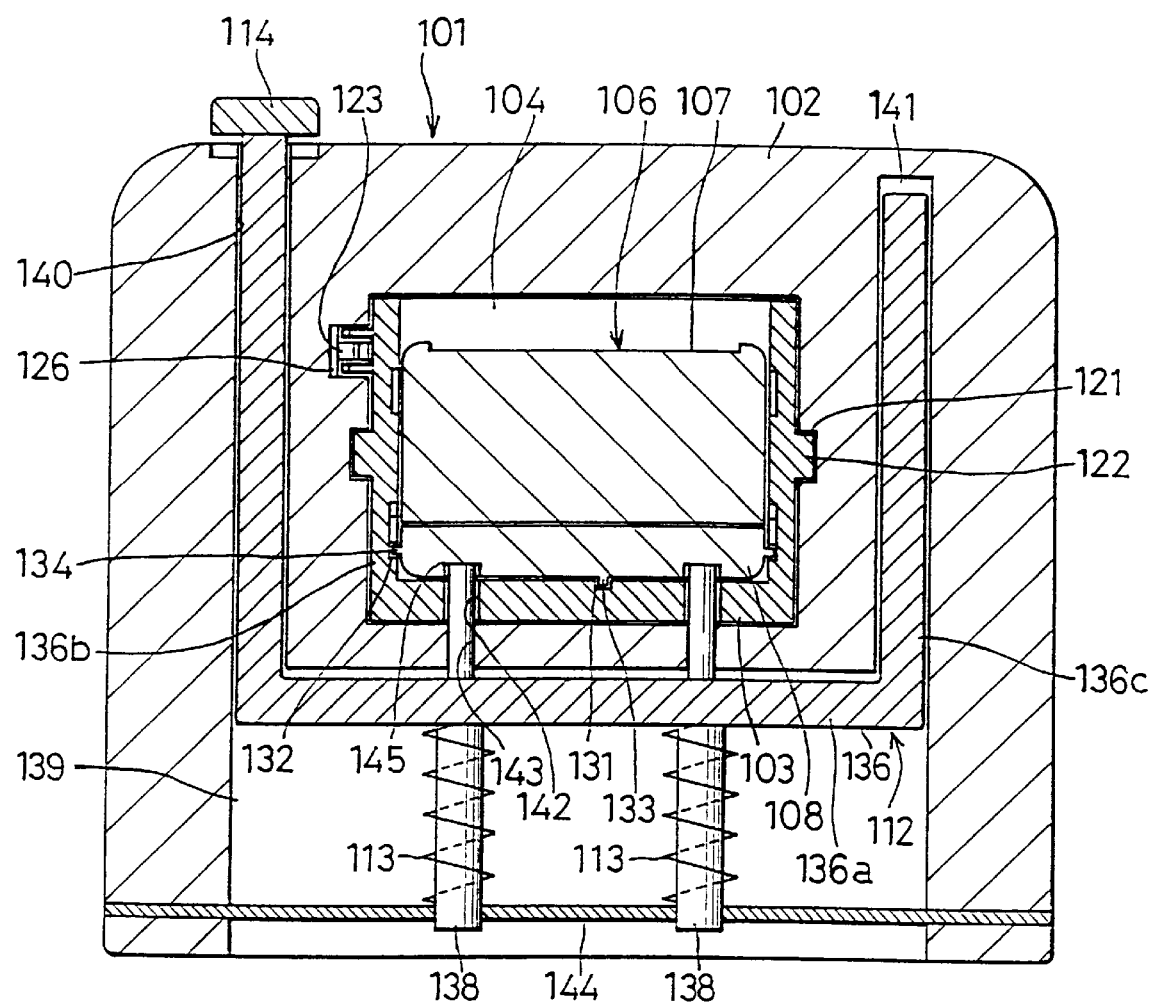
FIG. 15 is a section along XV—XV of FIG. 14.

As an engaging device for detachably coupling the casings 102, 103, an elastic lock portion 123 is formed on a rear upper part of one other side surface of the inner casing 103 and an engaging hole 125 is formed in a rear upper part of one corresponding inner side surface of the outer casing 102 as shown in FIGS. 12 and 13. The elastic lock portion 123 has a base end projecting outward from the outer side surface of the inner casing 103, and is bent forward in a position in vicinity of the base end so that its leading end is pivotal inward and outward due to the elasticity of its material. A lock projection 124 projecting outward is provided on the leading end. In an upper portion of the one inner side surface of the outer casing 102 is formed a groove 126 which allows the passage of the elastic lock portion 123. The groove 126 is made more shallow in vicinity of its rear end, and the engaging hole 125 is formed in this shallow portion 126a.

When the inner casing 103 is inserted into the outer casing 102, the elastic lock portion 123 passes the groove 126 and moves over the shallow portion 126a, and then the lock projection 124 is engaged with the engaging hole 125. As a result, the casings 102, 103 are coupled. The engaging hole 125 extends through the outer casing 102, so that the lock projection 124 can be disengaged from the engaging hole 125 by inserting a tool or the like into the engaging hole 125 from the outside. Further, a pair of projecting walls 127 continuous with the wall surface of the inner casing 102 are provided at the upper and lower sides of the elastic lock portion 123 to protect the elastic lock portion 123.

Guide grooves 131, 132 extending along phone insertion and withdrawal directions are formed in the upper surface of the bottom plate 103a of the inner casing 103 and in the inner surfaces of the opposite side walls 103b, 103c thereof. When the mobile phone 106 is accommodated in the phone accommodating portion 104, projections 133, 134 provided on the bottom and opposite side surfaces of the battery 108 are engaged with the respective guide grooves 131, 132. Front ends 131a, 132a of the guide grooves 131, 132 are widened in order to facilitate the engagement of the projections 133, 134. Although the guide grooves 131, 132 are formed both in the upper surface of the bottom plate 103a and in the inner surfaces of the opposite side walls 103b, 103c (i.e. the bottom and side surfaces of the phone accommodating portion 104) in this embodiment, the guide groove (s) may be formed in either one of the surfaces.

The lock member 112 includes a main portion 136 which includes a bottom beam 136a extending along widthwise direction of the holder main body 101 and side struts 136b, 136c extending upward at the opposite ends of the bottom beam 136a, a pair of lock pins 137 projecting upward from the upper surface of the bottom beam 136a, and a pair of spring mount rods 138 projecting downward from the lower surface of the bottom beam 136a. In the holder main body 101, notches 139, 140, 141 for accommodating the lock member 112 are formed in the outer casing 102 in a position toward the front. These notches 139, 140, 141 extend from one side to the other over the bottom of the phone accommodating portion 104. Between the phone accommodating portion 104 and the notch 139 at the bottom thereof are provided lock pin insertion holes 142, 143 which extend through the inner and outer casings 103, 102. The lock member 112 is arranged in the notch 139 movably upward and downward with the lock pins 137 inserted into the insertion holes 142, 143. The lock pins 137 project into and are retracted from the phone accommodating portion 104 as the lock member 112 moves upward and downward.

Springs 113 are mounted on the rods 138 of the lock member 112. These springs 113 are supported on spring seats 144 provided at the bottom end of the notch 139 to bias the lock member 112 upward.

At the upper end of each lock pin 137 is formed a slanted face 137a which is inclined upward to the backside. Further, recesses 145 engageable with the lock pins 137 are formed in the lower surface of the battery 108 of the mobile phone 106.

The upper end of one side strut 136b of the lock member 112 extends through the notch 140 and projects upward from the holder main body 101. To the upper end of this side strut 136b is secured the operable portion 114.

The push member 115 includes a U-shaped base 146, a vertical wall 147 projecting upward from the base 146 and a pair of spring mount rods 148 continuously provided at the rear end of the base 146. The vertical wall 147 is formed with an opening 149. The push member 115 is disposed at the back of the phone accommodating portion 104 movably forward and backward. With a rear portion of the base 146 of the push member 115 and springs 116 inserted into a flat hollow portion 150 formed in the outer casing 102, the push member 115 is biased forward by the springs 116. A notch 151 corresponding to the push member 115 is formed in a back wall 103d of the inner casing 103.

Behind the back of the phone accommodating portion 104 is arranged the connector 111 which is secured to the outer casing 102 while an engaging portion thereof with the phone side connector 109 is projecting into the phone accommodating portion 104 through the notch 151 of the inner casing 103 and the opening 149 of the push member 115.

The operation of the phone holder according to this embodiment is described next.

This phone holder is installed in a suitable position of a passenger compartment of an automotive vehicle, e.g. near a driver's seat. When a driver sets the mobile phone 106 in the phone holder, he inserts it into the phone accommodating portion 104 through the front side opening. At this time, the mobile phone 106 can be easily inserted because the tapered portion 120 is provided at the opening edge of the phone accommodating portion 104. Further, the mobile phone 106 can be easily positioned along width and vertical directions by the engagement of the projections 133, 134 provided on the battery 108 with the guide grooves 131, 132 formed in the inner casing 103.

When the mobile phone 106 is inserted into the phone accommodating portion 104 to a certain degree, the rear end of the mobile phone 106 comes into contact with the slanted faces 137a at the upper ends of the lock pines 137. As the mobile phone 106 is further inserted, the lock member 112 is temporarily pushed up against the elastic forces of the springs 113. When the mobile phone 106 reaches a specified accommodation position where it is completely accommodated in the phone accommodating portion 104, the recesses in the lower surface of the mobile phone 106 face the lock pins 137. The lock member 112 is pushed up by the springs 113, so that the leading ends of the lock pins 137 are fitted into the recesses 145. As a result, the mobile phone 106 is locked.

As the mobile phone 106 is accommodated into the phone accommodating portion 104 in the above manner, the phone side connector 109 is engaged with the connector 111 provided in the holder main body 101, with the result that an electrical connection can also simultaneously be established. The push member 115 is held in its retracted position against the elastic forces of the springs 116.

In this way, only by inserting the mobile phone 106 into the phone accommodating portion 104 from front, the mobile phone 106 can be accommodated and fixed in the phone holder. Thus, a driver can easily accommodate and fix the mobile phone 106 while doing an other operation (e.g. while driving a vehicle). With the mobile phone 106 accommodated in the phone holder, the driver can charge the mobile phone 106 or conduct a handsfree conversion via the connector 111.

Figure 16:
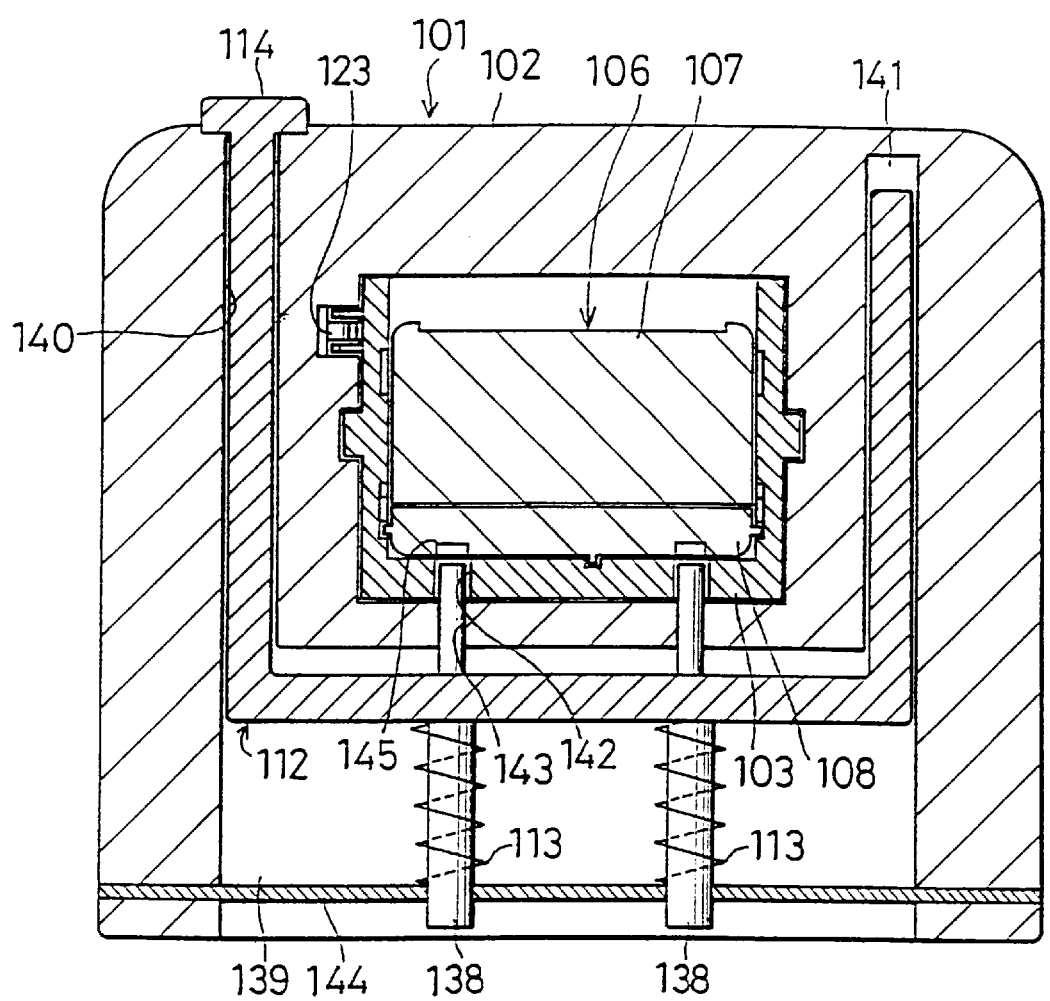
FIG. 16 is a section of the same portion as in FIG. 15 showing a state when the mobile phone is taken out of the phone holder.
Figure 17:
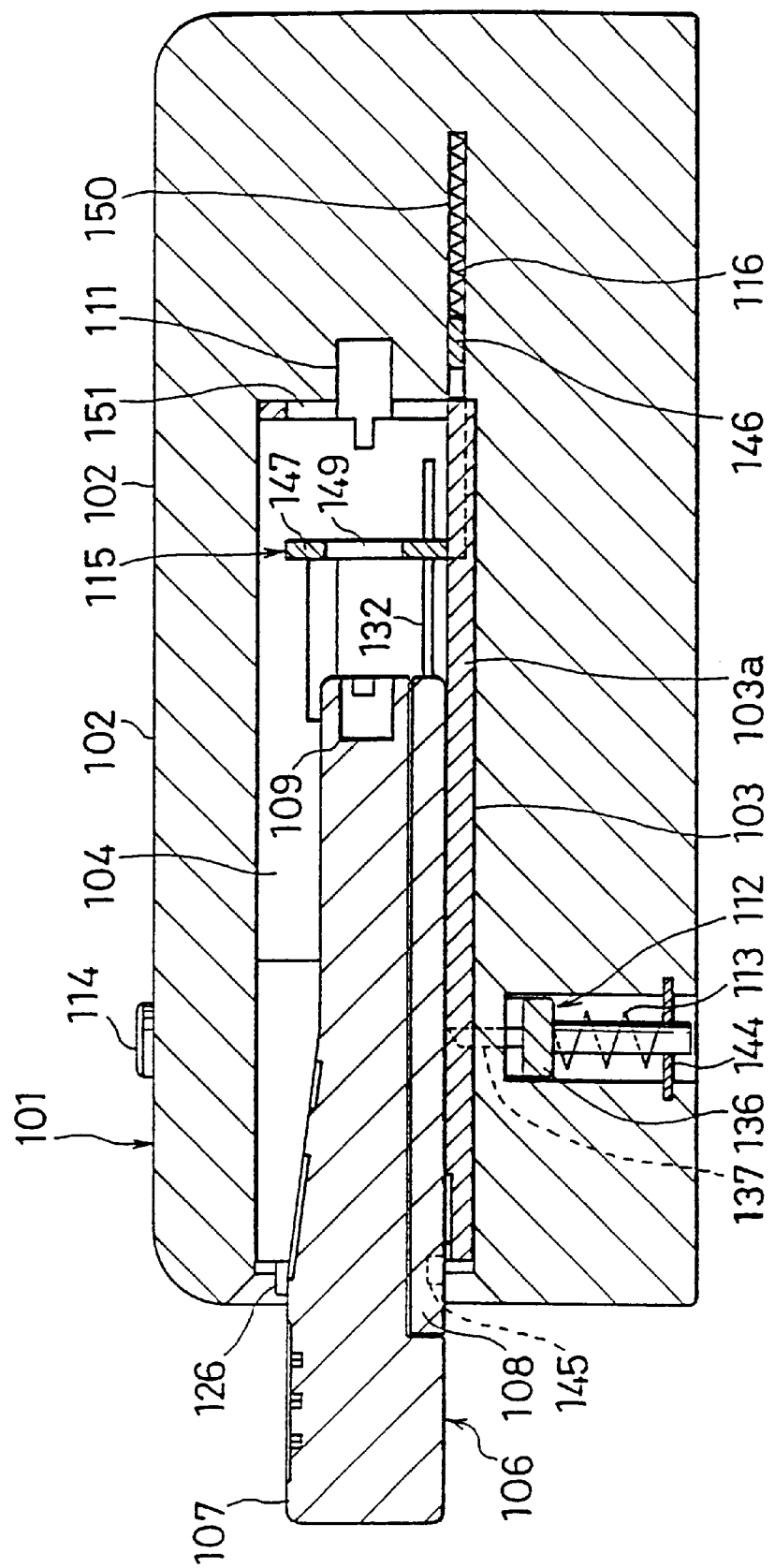
FIG. 17 is a side view in vertical section when the mobile phone is taken out of the phone holder of FIG. 10.

When the mobile phone 106 is to be taken out of the phone holder, the operable portion 114 provided at the upper end of the side strut 136b of the lock member 112 is pushed as shown in FIGS. 16 and 17. Thereby, the lock member is lowered, disengaging the lock pins 137 from the recesses 145 of the mobile phone 106. As a result, the mobile phone 106 is unlocked. Upon the release of the locked state, the push member 115 provided at the back of the phone accommodating portion 104 pushes the mobile phone 106 forward by being subjected to restoring forces of the springs 116, thereby pushing the mobile phone 106 forward of the holder main body 101. In this state, the driver or other person can easily take the mobile phone 106 out by gripping it.

Effects realized by the locking device of this embodiment: the mobile phone can be securely fixed in the phone accommodating portion and the connectors can be connected only by a simple operation of inserting the mobile phone in to the phone accommodating portion, and the locked state of the mobile phone by means of the locking device can be easily released by operating the unlocking device, thereby making it easy to take the mobile phone out, can also be obtained by a combination of the above described phone holder in which the inner and outer casings 103, 102 are not divided, i.e. the holder main body is unitary, and the locking device according to this embodiment.

A seventh embodiment of the invention is described with reference to FIGS. 18 to 29.

Figure 18:
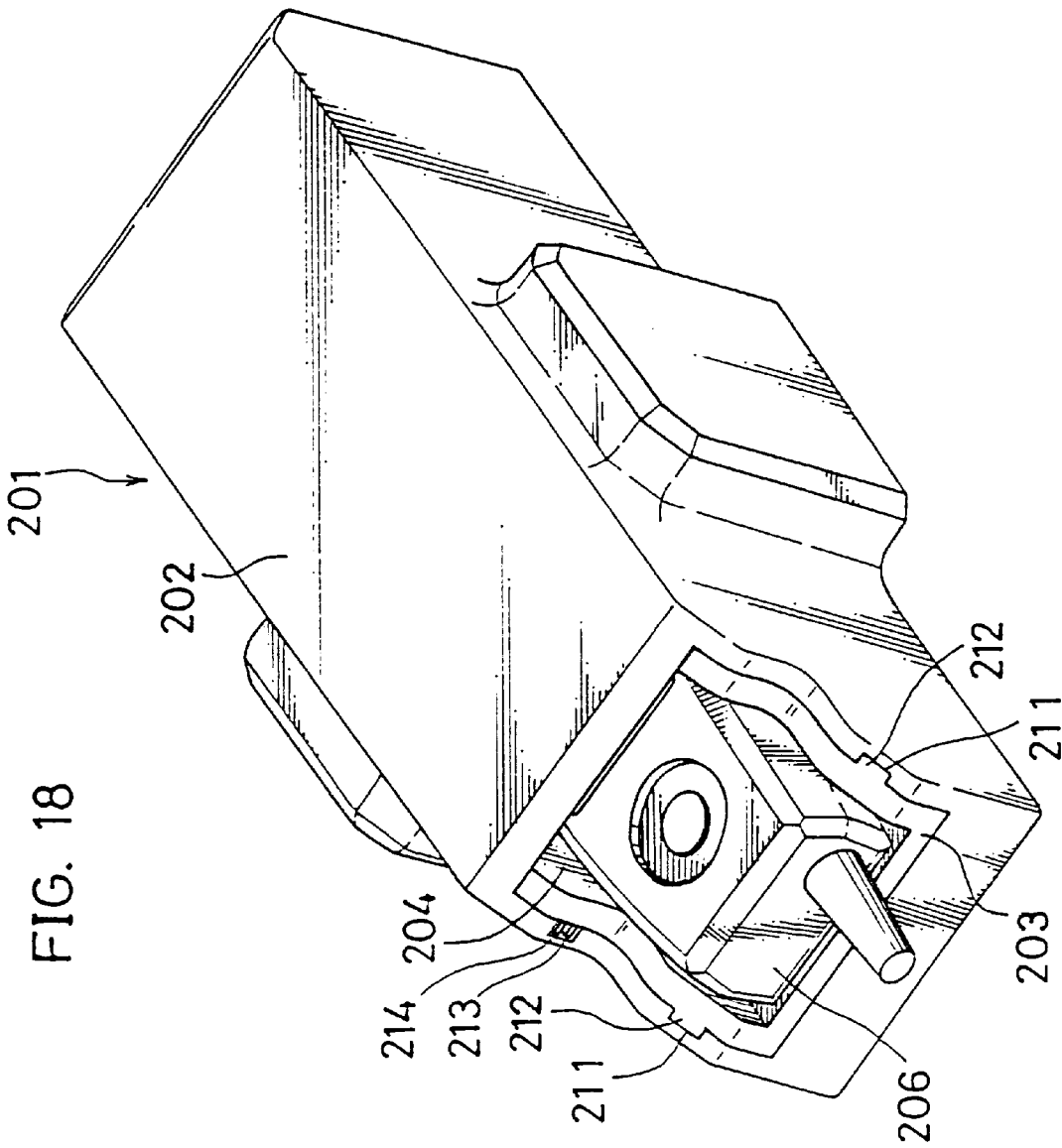
FIG. 18 is a perspective view of a phone holder according to a seventh embodiment of the invention showing a state where a mobile phone fitted into an inner casing is accommodated in the phone holder.
Figure 19:
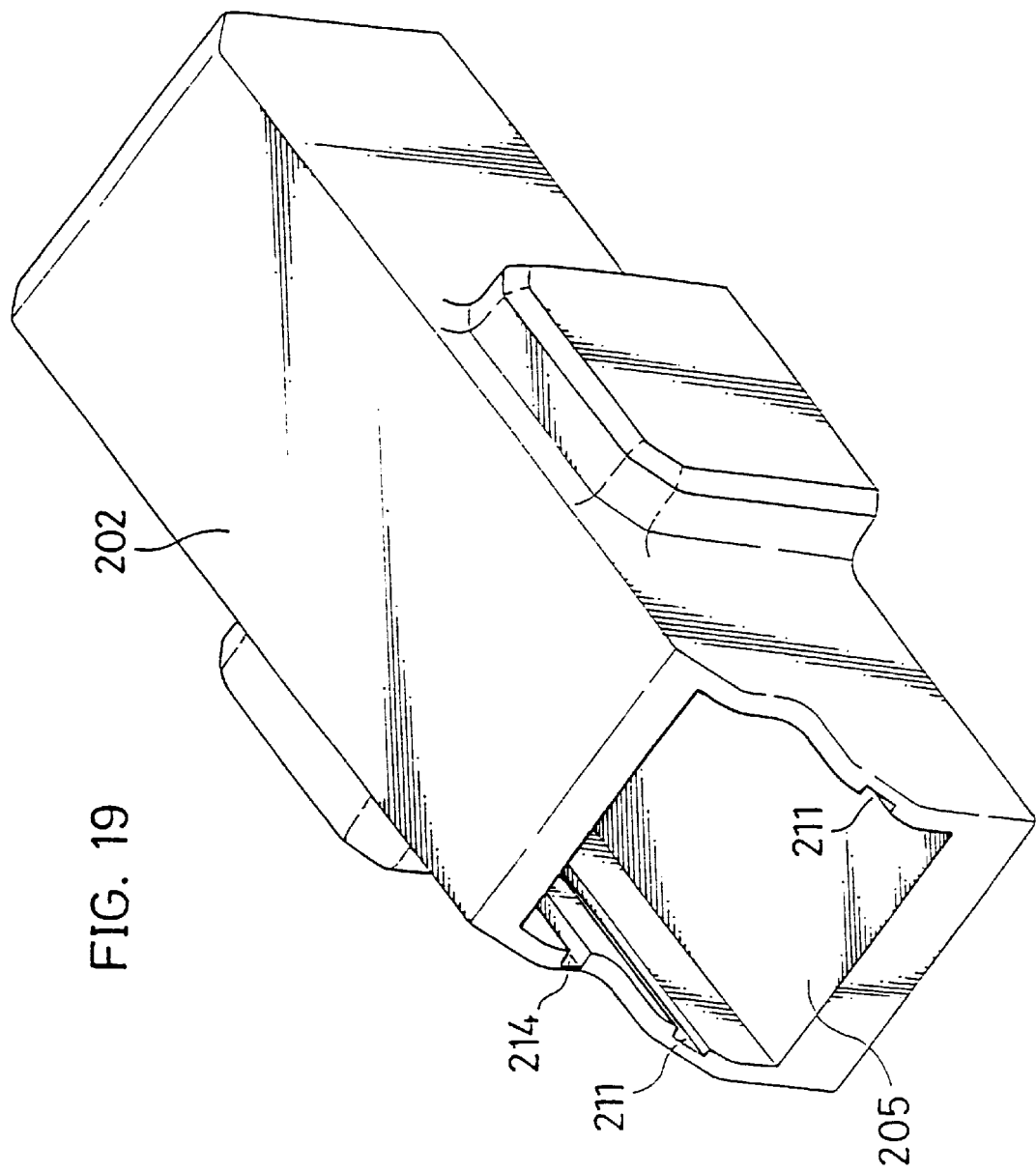
FIG. 19 is a perspective view of only the outer casing with the inner casing of the phone holder of FIG. 18 detached therefrom.
Figure 20:
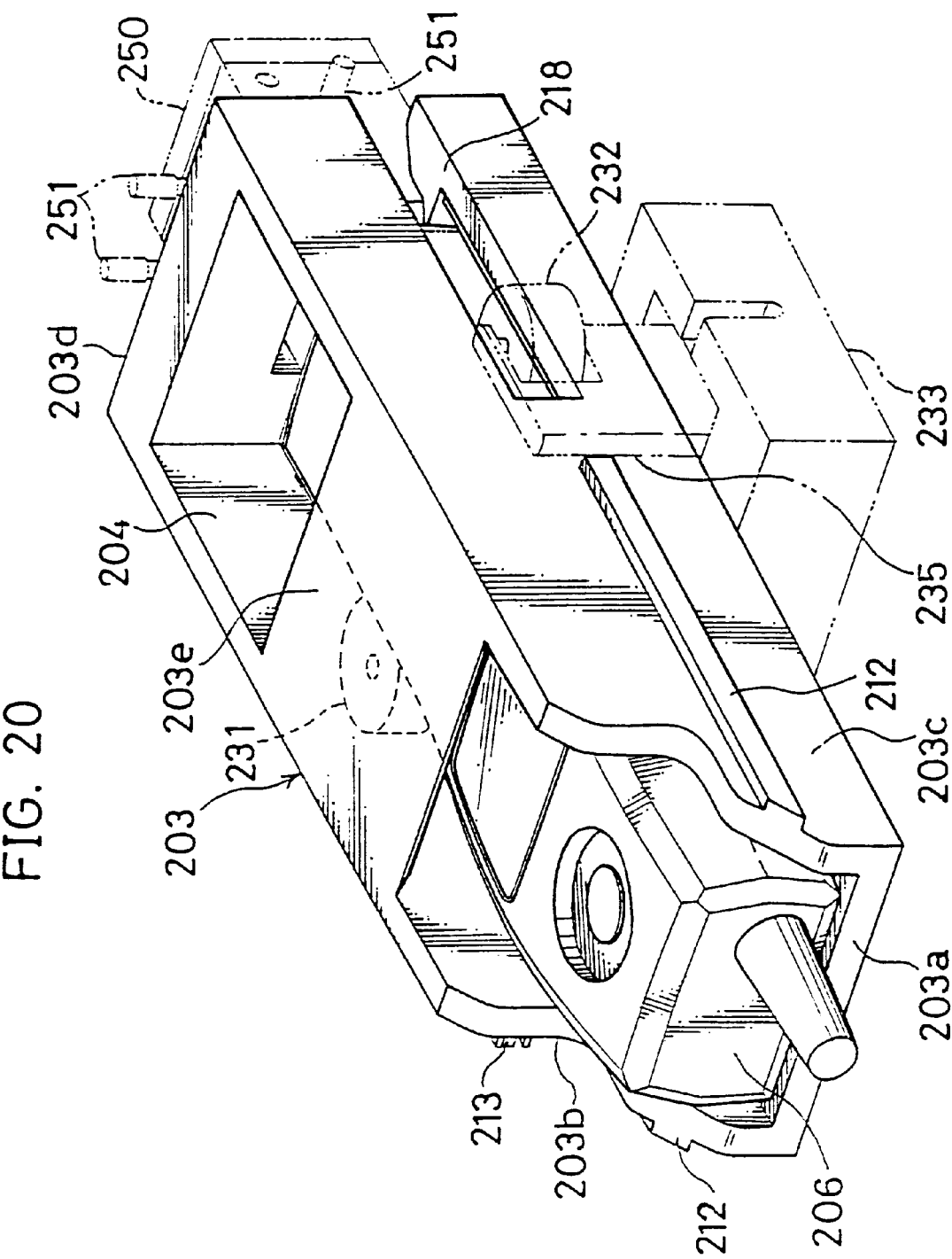
FIG. 20 is a perspective view of the phone holder of FIG. 18 with the mobile phone fitted in the inner casing.
Figure 21:
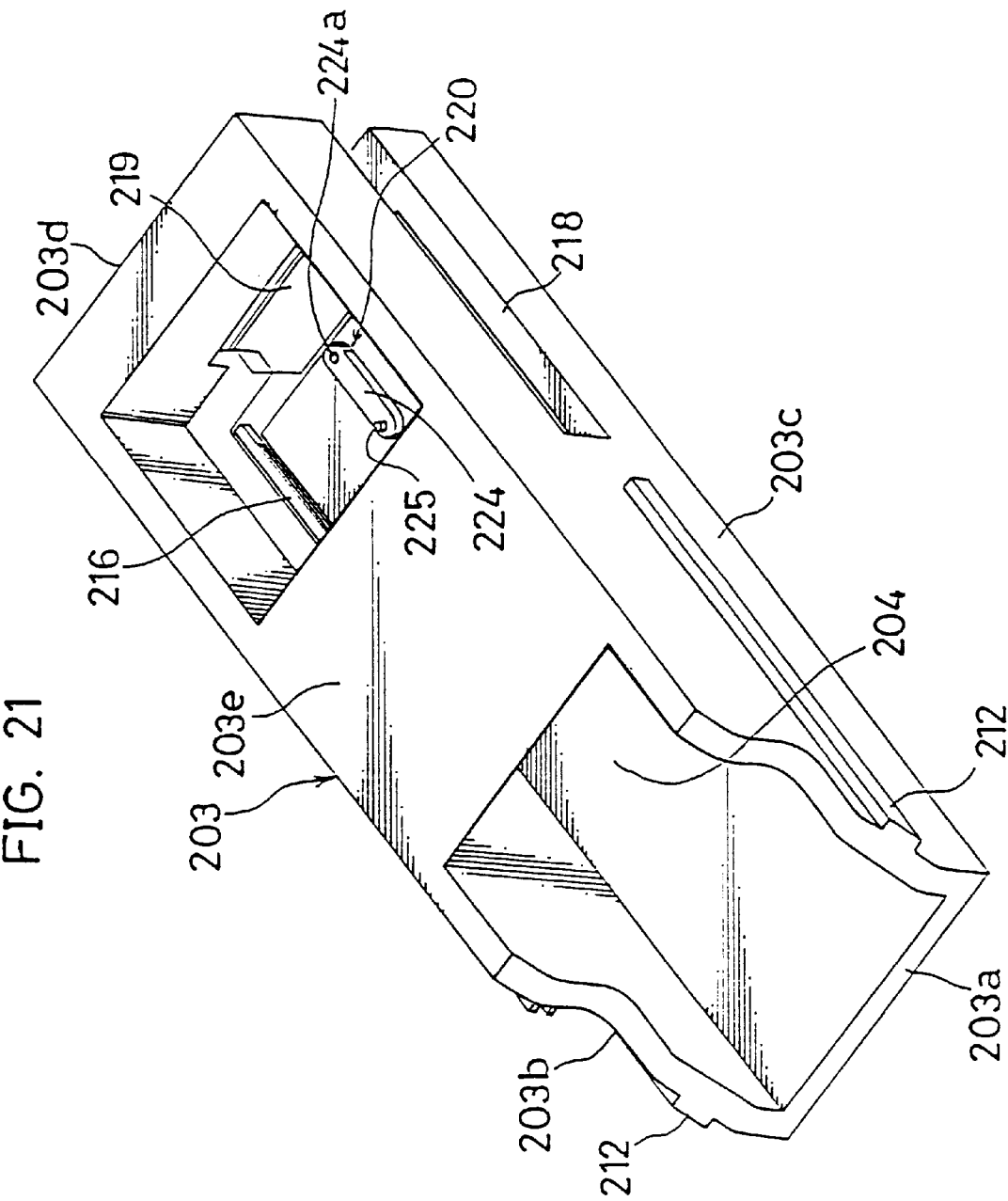
FIG. 21 is a perspective view of only the inner casing of the phone holder of FIG. 18 with the mobile phone detached therefrom.

FIGS. 18 to 22 are perspective view of the seventh embodiment of the phone holder according to the invention. FIG. 18 shows a state where a mobile phone fitted into an inner casing is accommodated in the phone holder. FIG. 19 shows only the outer casing with the inner casing detached therefrom. FIG. 20 shows the mobile phone accommodated in the inner casing. FIG. 21 shows only the inner casing with the mobile phone detached therefrom.

As shown in FIG. 18, the phone holder includes a holder main body 201 including an outer casing 202 and an inner casing 203. This holder main body 201 has a hollow phone accommodating portion 204 which is open in one end. A mobile phone 206 can be detachably accommodated in the phone accommodating portion 204. Similar to the foregoing embodiments, the holder main body 201 can be used for a variety of types of mobile phones 206 having, for example, different sizes by exchanging the inner casing 203 according to the type of the mobile phone 106 to be accommodated.

As shown in FIG. 19, the outer casing 202 has a long box shape and a hollow portion 205 which is open in one end. This hollow portion 205 is formed larger than a variety of mobile phones 206 in view of their solid configurations.

Accordingly, even if the solid configuration of the phone 206 is changed due to a model change, this phone holder can be used for such a phone 206 by using the inner casing 203 in conformity with the new solid configuration (see FIG. 20). The outer casing 202 is fixed near a driver's seat in an automotive vehicle. For example, the outer casing may be secured to a lid of a console box with the opening facing the driver or may be integrally formed therewith. By forming the outer casing 202 in this manner, the driver can easily insert and detach the mobile phone 206 into and from the outer casing 202.

Figure 22:
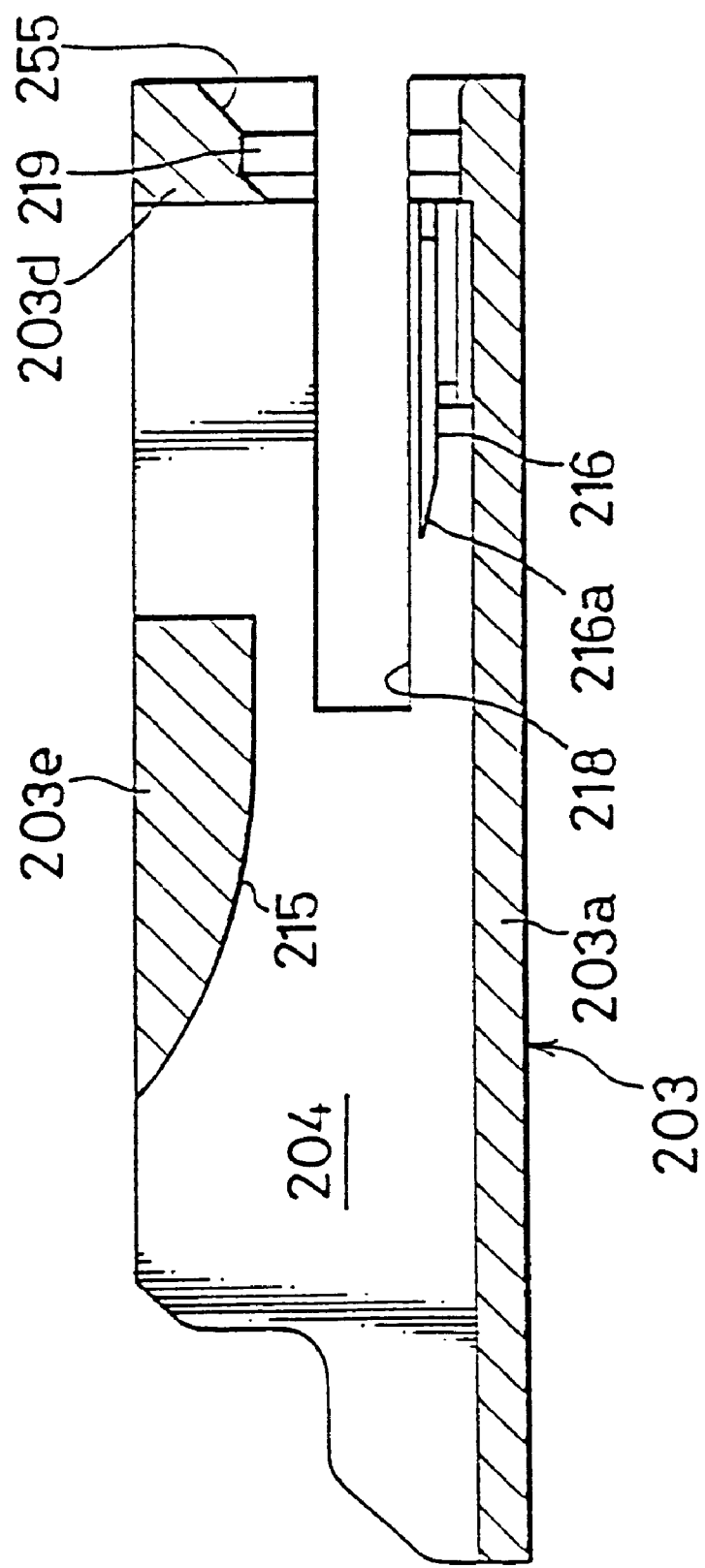
FIG. 22 is a side view in section of the inner casing of FIG. 21.

FIG. 22 is a side view in section of the inner casing 203 of FIG. 21. As shown in FIGS. 20 to 22, the inner casing 203 includes a bottom plate 203a, a left side wall 203b, a right side wall 203c and a back wall 203d. An upper plate 203e is provided at a part of the upper surface of the inner casing 203 to define the phone accommodating portion 204. A plurality of types of inner casings 203 having phone accommodating portions 204 of different configurations are prepared in advance in order to conform to the solid configurations of different types of mobile phones 206. By selecting one inner casing 203 corresponding to the mobile phone 206 to be accommodated, the mobile phone 206 can be accommodated in the hollow portion 205 of the outer casing 202 regardless of a model change.

A pair of guide grooves 211 extending in forward and backward directions are formed in the inner surfaces of the opposite side walls of the outer casing 202, whereas a pair of elongated projections 212 are formed on the outer surface of front portions of the opposite side walls 203b, 203c of the inner casing 203 in positions corresponding to the respective guide grooves 211. The inner casing 203 is fitted in the outer casing 202 movably in forward and backward directions while being positioned with respect to vertical direction by the elongated projections 212 being slidably fitted in the corresponding guide grooves 211. Further, an elastic lock portion 213 (see FIG. 20) is provided on the outer surface of the left side wall 203b of the inner casing.203. With the inner casing 203 fitted in the outer casing 202, the elastic lock portion 213 comes into engagement with an oblong hole 214 extending in forward and backward directions which is formed in the outer casing 202.

Upper corner portions of the opposite side walls 203b, 203c at the front end near the opening of the outer casing 202 are cut away to have a stepwise shape when viewed sideways (see FIGS. 18 and 19), so that the mobile phone 206 can be easily inserted obliquely from above. A portion of the inner casing 203 near the front end opening has a corresponding shape in order to improve the appearance of the phone holder when the inner casing 203 is accommodated in the outer casing 202.

As shown in FIG. 22, the inner casing 203 has a curved surface 215 at a front end portion of the upper plate 203e. The curved surface 215 has an arcuate shape so that a distance to the bottom plate 203a is longer toward the front end opening. A distance between the upper plate 203e and the bottom plate 203a behind the curved surface 215 is set slightly larger than the thickness of the mobile phone 206. Thus, the mobile phone 206 can be more easily accommodated into the inner casing 203.

The inner casing 203 is provided with rails 216 at the bottoms of rear portions of the inner surfaces of the opposite side walls 203b, 203c. The rails 216 extend in forward and backward directions and is adapted to position the mobile phone 206. A front end 216a of each rail 216 is thinned to facilitate the engagement with an engaging groove 217 to be described later.

The inner casing 203 is also provided with guide grooves 218 formed in the rear portions of the opposite side walls 203b, 203c for allowing the passage of rollers 231, 232 to be described later. The guide grooves 218 extend from a substantially middle position of the side walls 203b, 203c to the rear end thereof. In the back wall 203d is formed an opening 219 for introducing a connector.

Figure 23:
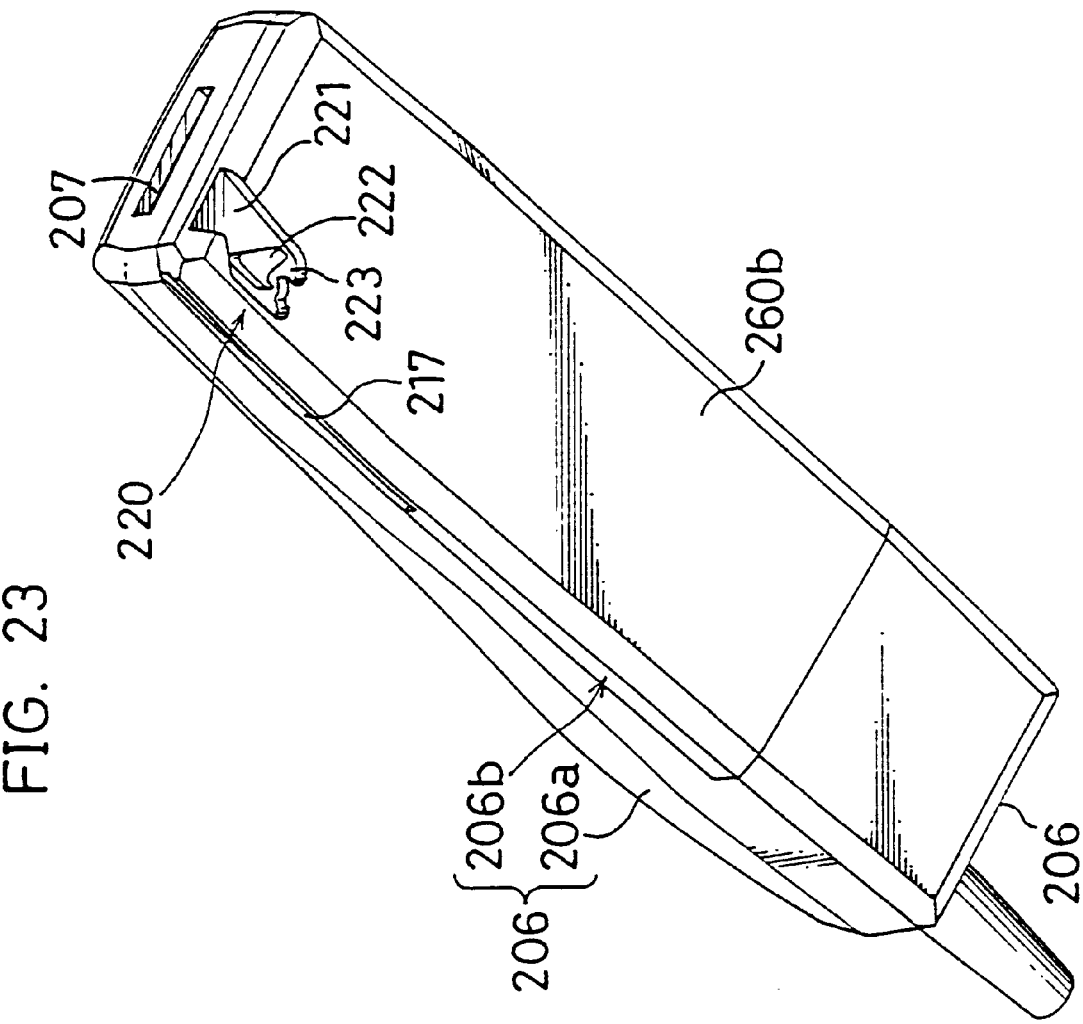
FIG. 23 is a perspective view of the mobile phone according to the seventh embodiment when viewed from below.

FIG. 23 is a perspective view of the mobile phone 206 when viewed from below. As shown in FIG. 23, the mobile phone 206 includes a phone main body 206a and a charging unit 206b detachably mounted on the bottom surface of the phone main body 206a. The charging unit 206b includes an unillustrated battery loaded inside and a battery casing 260b for accommodating this battery. The engaging grooves 217 corresponding to the rails 216 (see FIG. 22) are formed in the opposite side portions of the battery casing 260b.

A phone side connector 207 is provided at the rear end of the phone main body 206a. A holder connector 208 (see FIG. 26) corresponding to the phone side connector 207 is arranged at the back of the holder main body 201. In the respective connectors 207, 208 are arranged terminals for the handsfree conversation, the connection with a vehicle antenna, the charging, etc. The holder connector 208 is connected with an unillustrated controller via an electric wiring provided in a console box or the like, so that a driver can use the mobile phone 206 via the controller by operating an operable portion provided on a steering wheel or the like in a specified manner.

Between the inner casing 203 of the holder main body 201 and the battery casing 260b of the mobile phone 206 is provided a phone locking device 220 for switching the state of the mobile phone 206 between a lock state where the mobile phone 206 is locked in a specified accommodation position of the phone accommodating portion 204 and an unlock state in which the mobile phone 206 is unlocked. Further, the holder main body 201 is provided with an actuating device 230 for advancing the mobile phone 206 from the specified accommodation position of the phone accommodating portion 204, and an unillustrated damper for moderating the advancement of the mobile phone 206 caused by the actuating device 230 by giving a resistance.

The phone locking device 220 is provided with a locking mechanism of push-on/push-off type which adopts a heart-shaped cam 222 as shown in FIGS. 23 and 24. Specifically, a recess 221 of specified shape is formed in the bottom surface of a rear portion of the charging unit 206b of the mobile phone 206, and the heart-shaped cam 222 is provided inside the recess 221. On the other hand, a rod 224 having its rear end pivotally supported about a support shaft 224a is provided in a rear portion of the inner casing 203 of the holder main body 201 as shown in FIG. 21. A pin 225 projects from the leading end of the rod 224. As described in detail later, the state of the pin 225 is switched between a state where it locks the cam 222 and a state where it does not lock the cam 222 only by pushing the mobile phone 206 into the inner casing 203.

The actuating device 230 includes a phone actuating roller 231 which is in contact with one side surface of the mobile phone 206 as shown in FIG. 20, and a biasing device for biasing the roller 231 in a specified rotational direction corresponding to the advancing direction of the mobile phone 206. The roller 231 and the biasing device are mounted on the left side wall 203b of the outer casing 202. An idle roller 232 which is in contact with the other side surface of the mobile phone 206 is provided in the right side wall 203c of the outer casing 202. The positions of the rollers 231, 232 are adjustable along widthwise direction of the holder main body 201 according to the size of the mobile phone 206. In addition, the rollers 231, 232 are biased inwardly by a biasing device for the position adjustment so as to be brought into contact with the opposite side surfaces of the mobile phone 206 through the guide grooves 218.

Figure 25:
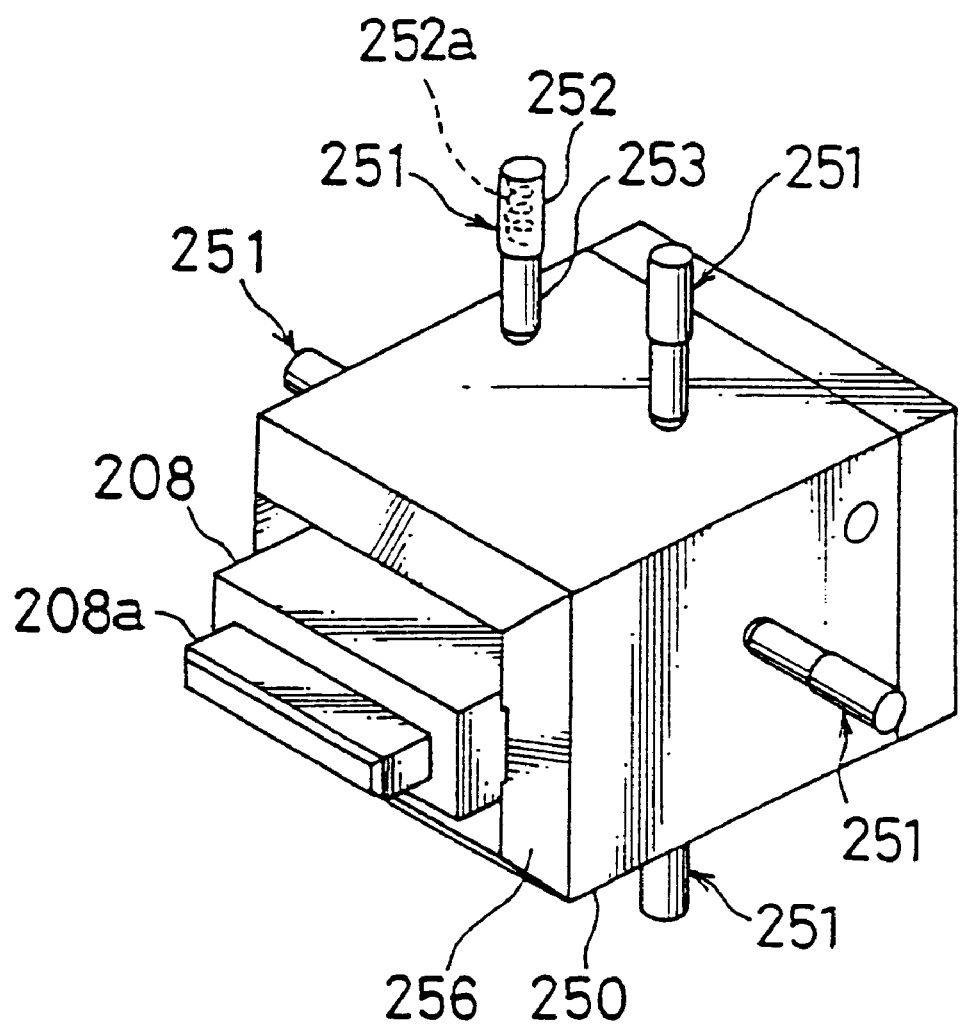
FIG. 25 is a perspective view of a connector and a connector casing.
Figure 26:
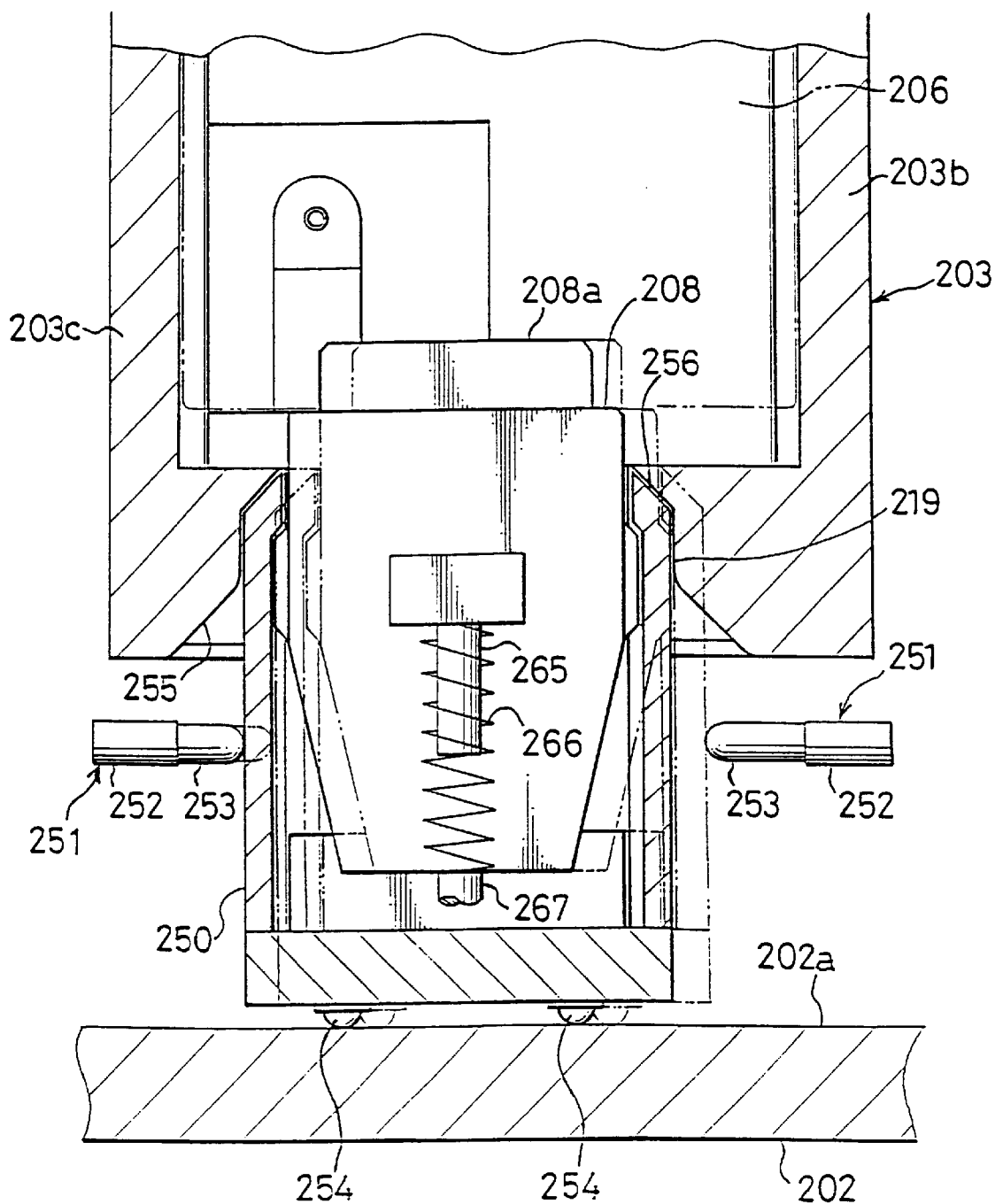
FIG. 26 is a plan view in section of the inner casing connected with the connector casing.
Figure 27:
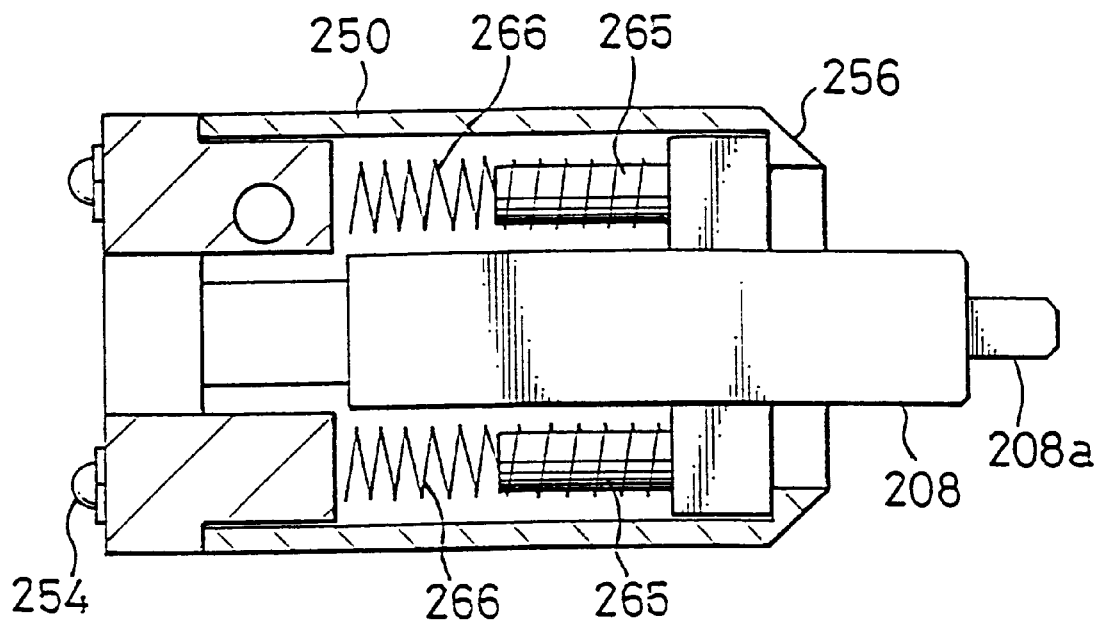
FIG. 27 is a side view in section of the connector casing.

FIG. 25 is a perspective view of one embodiment of a connector casing 250; FIG. 26 is a plan view in section of the inner casing 203 connected with the connector 250; and FIG. 27 is a side view in section of the connector 250. As shown in FIGS. 25 to 27, the connector casing 250 detachably holds the holder connector 208 inside, and is disposed in the back wall 202a of the outer casing 202 of the holder main body 201 while its forward (upward in the plane of FIG. 26) movement is restricted by an unillustrated restricting member as shown in FIG. 26. The holder connector 208 is mounted in the connector casing 250, and faces the phone accommodating portion 204 through the opening 219 formed in the back wall of the inner casing 203.

The connector casing 250 is in the form of a rectangular parallelepipedic box having a front opening, and is elastically movably supported along vertical and transverse directions by a multitude of elastic support members 251 provided on the outer casing 202. Each elastic support member 251 includes a tube member 252 provided on the connector casing 202 and a pin 253 supported by a spring member 252a inside the tube member 252 so as to be elastically projectable. The elastic support members 251 are provided at the upper, lower and opposite side walls of the connector casing 250. The connector casing 250 can be held in a specified neutral position by the contact of the respective pins 253 with the connector casing 250 when no external force acts.

The position of the connector casing 250 can be changed in a two-dimensional manner along the unillustrated restricting member in a direction (transverse direction of FIG. 26) normal to the length (phone insertion/withdrawal directions) of the holder main body 201. When the inner casing 203 is fitted into the outer casing 202, the connector casing 250 is moved along widthwise direction by the mutual interference with the inner casing 203 to adjust the position thereof. Thus, even if the position of the connector 207 at the rear end surface of the mobile phone 206 differs according to the type of the mobile phone 206, the position of the holder connector 208 provided at the holder main body 201 is automatically adjusted, with the result that the phone side connector 207 and the holder connector 208 can be connected regardless of the type of the mobile phone 206.

Specifically, the rear end of the connector casing 250 is in sliding contact with the back wall 202d of the outer casing 202, a semispherical projection 254 is provided at this contact portion to reduce a frictional resistance. Thus, the connector casing 250 can be smoothly moved along widthwise direction.

The opening 219 of the back wall 203d of the inner casing 203 is provided in a position corresponding to the position of the connector 208 of the mobile phone 206 to be used and has a size corresponding to the connector casing 250. A tapered portion 255 which widens toward the back is formed at a rear portion (lower portion in FIG. 26) of the opening 219. At a front end portion of the connector casing 250 is formed a tapered portion 256 toward the front.

With the above construction, the opening 219 is located around the connector casing 250 as the inner casing 203 is fitted into the outer casing 202. At this time, even if the position of the connector casing 250 is displaced with respect to the opening 219, for example, as shown by phantom line in FIG. 26, the connector casing 250 is guided to the opening 219 by the sliding contact of the tapered portions 255, 256. As a result, the connector casing 250 is moved along widthwise direction so as to be aligned with the opening 219 as shown by solid line in FIG. 26, thereby having the position thereof automatically adjusted.

Figure 28:
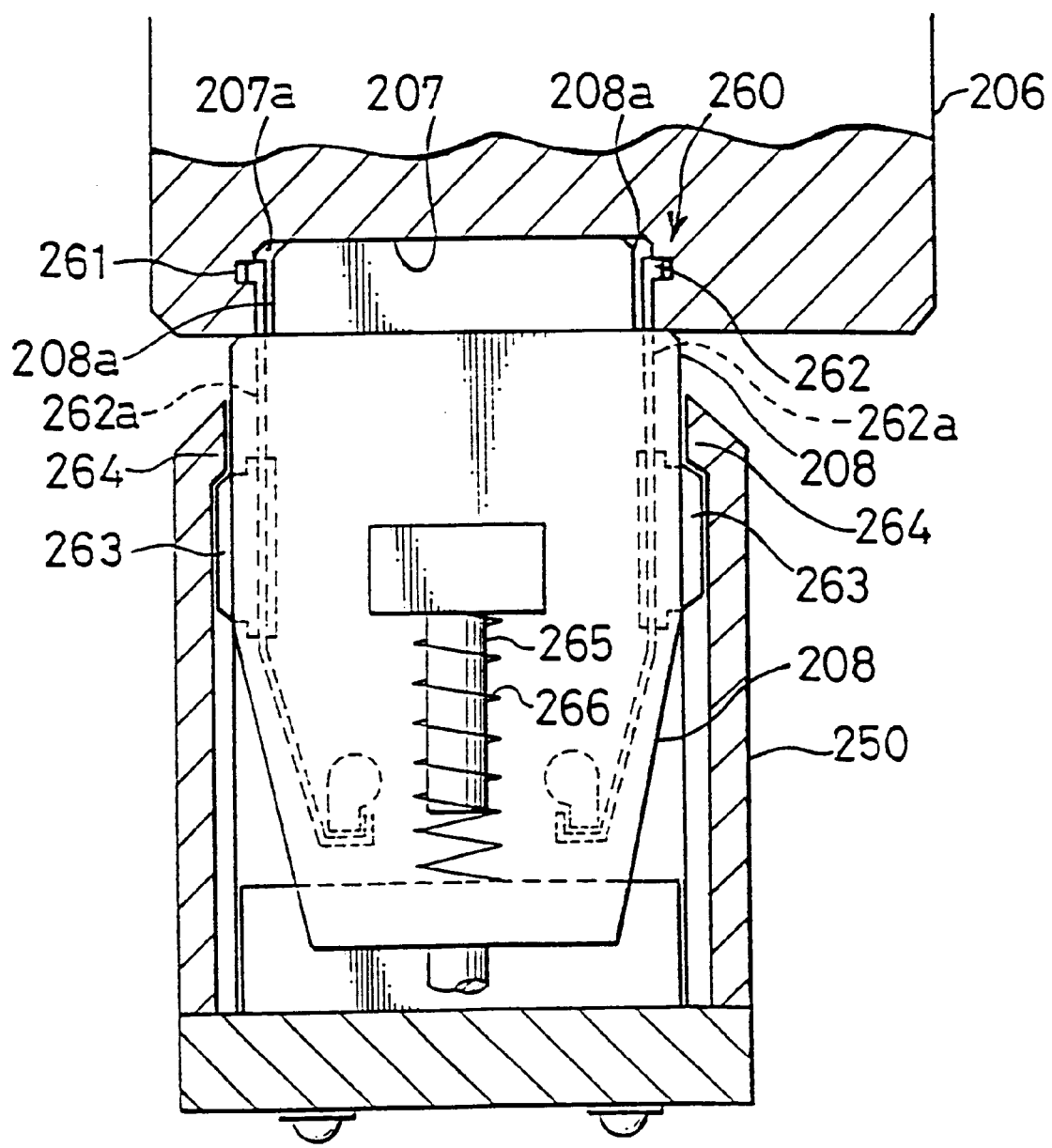
FIG. 28 is a plan view in section showing connectors locked with each other by a connector locking mechanism provided between a phone side connector and a holder connector.
Figure 29:
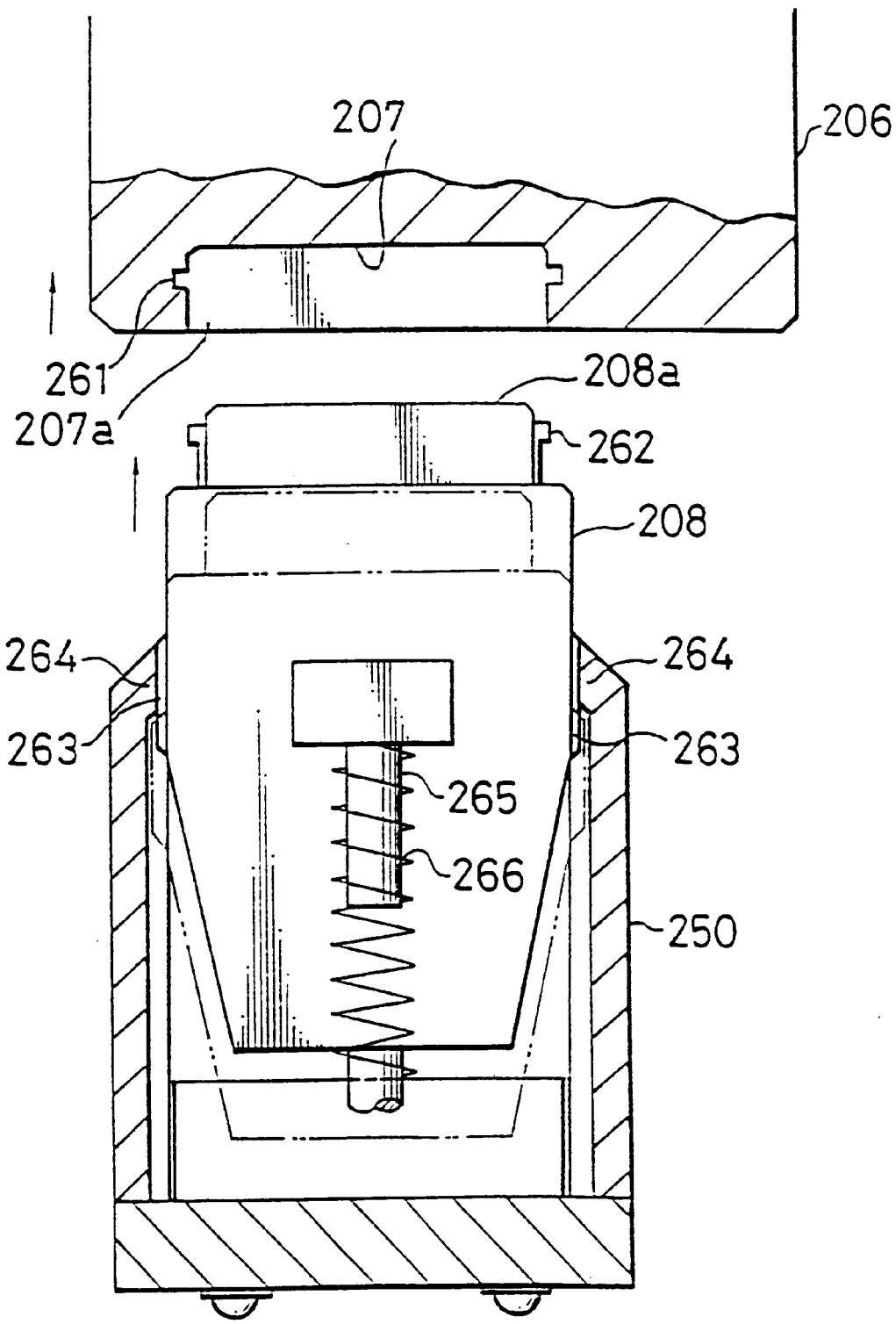
FIG. 29 is a plan view in section showing an unlocking state of the connector locking mechanism of FIG. 28.

FIGS. 28 and 29 are plan views in section of one embodiment of a connector locking mechanism 260 provided between the phone side connector 207 and the holder connector 208. FIGS. 28 and 29 show a lock state where the connectors 207, 208 are locked by the locking mechanism 260 and an unlock state where they are unlocked by the locking mechanism 260, respectively. In order to securely connect the connectors 207, 208 when the mobile phone 206 is accommodated into the inner casing 203 as shown in FIGS. 28 and 29, the locking mechanism 260 for locking the holder connector 208 with the phone side connector 207 is provided. The locking mechanism 260 automatically switches between the lock and unlock states as the mobile phone 260 is inserted into or detached from the holder main body 201.

Specifically, an engaging recess 207a is formed in the connector 207 of the mobile phone 206 and a pair of engaging grooves 261 which are opposed to each other with respect to widthwise direction are formed in the opposite side walls of the recess 207a. On the other hand, an engaging projection 208a corresponding to the recess 207a is provided at the leading end of the holder connector 208, and a pair of lock portions 262 corresponding to the engaging grooves 261 are provided on the opposite sides of the projection 208a. The respective lock portions 262 are elastically pivotal along widthwise direction by having the rear ends thereof (lower portions in FIGS. 28 and 29) elastically held in the projection 208a of the holder connector 208. A pair of unlock buttons 263 are mounted in intermediate positions of the lock portions 262. The unlock buttons 263 are projectably and retractably provided at the opposite sides of the holder connector 208, and the lock portions 262 are made elastically pivotal by the projection and retraction of these unlock buttons 263.

The connector locking mechanism 260 automatically unlocks the connectors 207, 208 when the mobile phone 206 is taken out of the phone holder. In other words, the holder connector 208 is made movable with respect to the connector holder 250 within a specified range along forward and backward directions, and a pair of pressing portions 264 corresponding to the unlock buttons 263 are provided at front end portions (upper portions in FIGS. 28 and 29) of the opposite side walls of the connector holder 250 so as to be projectable in directions toward each other.

When the connector holder 208 is located in a rear part of the movable range with respect to the connector housing 250, i.e. when it is mounted in the connector casing 250, the pressing portions 264 and the unlock buttons 263 are displaced along forward and backward directions as shown in FIG. 28, with the result that the unlock buttons 263 project. When the holder connector 208 is moved toward a front part of the movable range, i.e. when the mobile phone 206 is pulled forward in a state shown in FIG. 28, the pressing portions 264 push the unlock buttons 263 and the lock portions are pivoted inward accordingly.

Spring mount portions 265 project from the upper and lower surfaces of the holder connector 208, and coil springs 266 for biasing the holder connector 208 forward are mounted between the spring mount portions 265 and the connector casing 250. With the holder connector 208 are connected wires connected with a controller and the like. Identified by 267 is a wire coming from the connector.

The operation of this embodiment will be described.

When the inner casing 203 is to be fitted into the outer casing 202 secured in advance in a specified position of a passenger compartment of a vehicle to be fixed, one inner casing 203 having a size corresponding to the size of the mobile phone 206 to be used and the opening 219 in such a position corresponding to the position of the phone side connector 207 is selected and fitted into the outer casing 202 (FIG. 18).

As the inner casing 203 is fitted into the outer casing 202, the connector casing 250 provided in advance on the outer casing 202 is engaged with the opening 219 at the rear end of the inner casing 203 while being guided by the tapered portions 255, 256, with the result that the position of the connector casing 250 is automatically adjusted so that the holder connector 208 in the connector casing 250 faces the phone side connector 207 (FIG. 26). Further, the inner casing 203 is fixed to the outer casing 202 by the elastic lock portion 213 (FIG. 20). In this way, the holder main body 201 corresponding to the mobile phone 206 to be used is assembled as shown in FIG. 18.

When the mobile phone 206 is to be accommodated in the holder main body 201, it is inserted into the phone accommodating portion 204 of the inner casing 203 from front. At this time, since the curved surface (see FIG. 22) is formed at the front end of the upper plate 203e of the inner casing 203, the mobile phone 206 is easily guided into the phone accommodating portion 204 even if the position and angle thereof are slightly displaced and deviated, respectively and the position and angle of the mobile phone 206 are gradually corrected as the mobile phone 206 is inserted into the phone accommodating portion 204. When the mobile phone 206 approaches the specified accommodation position, the engaging grooves 217 on the opposite side surfaces thereof are engaged with the rails 216 (see FIGS. 21 and 22) provided on the inner casing 203, with the result that the mobile phone 206 is properly positioned.

During the insertion of the mobile phone 206, the phone actuating roller 231 and the idle roller 232 of the actuating device 230 are brought into contact with the opposite side surfaces of the mobile phone 206. As the mobile phone 206 is further inserted, the roller 231 is rotated in a direction opposite from the specified rotational direction, thereby storing a biasing force in the unillustrated biasing device such as a helical spring to bias the roller 231 in the specified rotational direction.

Figure 24A:
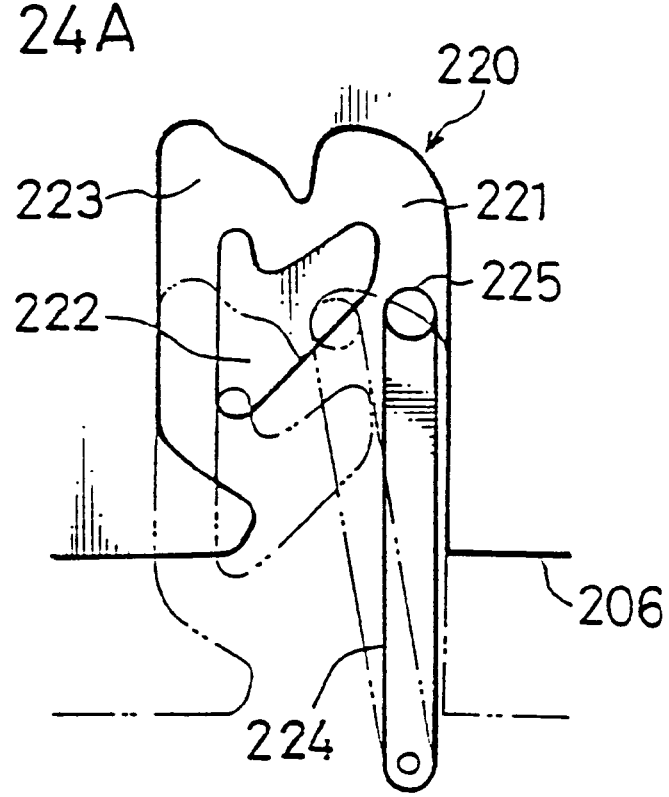
Figure 24B:
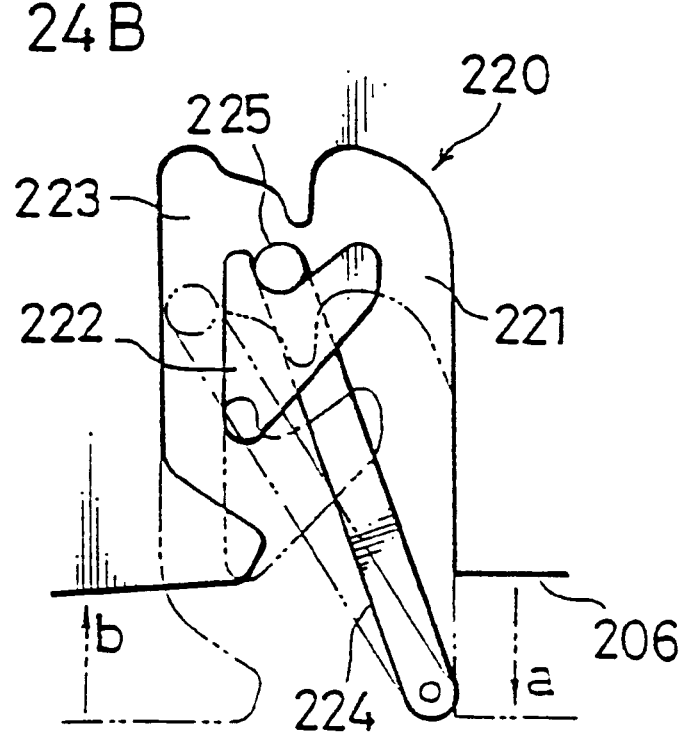

When the mobile phone 206 is inserted to the specified accommodation position, it is locked by the phone locking device 220. Specifically, as shown in FIG. 24A, as the mobile phone 206 is moved backward, the pin 225 provided at the leading end of the rod 224 provided in the inner casing 203 enters the guide groove 223 around the heart-shaped cam 222 provided in the charging unit 206b of the mobile phone 206 (state shown by solid line). The rod 224 is pivoted by the movement of the pin 225 guided by the guide groove 223, with the result that the heart-shaped came 222 and the pin 225 face each other (state shown by phantom line). The mobile phone 206 is slightly pushed back by a force given from the actuating device 230, thereby locking the pin 225 and the heart-shaped cam 222 as shown by solid line in FIG. 24B. Thus, the mobile phone 206 is locked so as not to come out of its specified accommodation position.

Simultaneously, the connector 207 at the rear end of the mobile phone 206 and the holder connector 208 are engaged as shown in FIG. 28, and the connectors 207, 208 are pushed toward the backside of the connector casing 250 (downward in FIG. 28). In this state, the lock portion 262 of the connector locking mechanism 260 is engaged with the engaging groove 261, locking the connectors 207, 208 in their engaged states.

As described above, only by inserting the mobile phone 206 into the holder main body 201, the mobile phone 206 is locked in its specified accommodation position at the same time the connectors 207, 208 are securely connected. This state prevents the mobile phone 206 from unexpectedly coming out of the holder main body 201 and enables a handsfree conversation, charging, etc.

In order to take the mobile phone 206 out of the phone accommodating portion 204, after the mobile phone 206 is pushed from front, a pushing force is released. Thereby, in the phone locking device 220, the pin 225 is moved along the bent portion of the guide groove 223 from the locked state shown by solid line in FIG. 24B as the mobile phone 206 is moved backward (direction of arrow a), with the result that the rod 224 is pivoted sideways as shown by phantom line in FIG. 24B. As the pushing force is released, the mobile phone 206 is moved forward (direction of arrow b) by the force given from the actuating device 220, and the pin 225 of the rod 224 comes out of the guide groove 223 at the side of the heart-shaped cam 222. As a result, the phone locking device 220 is unlocked.

As described above, as the phone locking device 220 is brought into its unlock state and the mobile phone 206 is moved forward (moved upward in FIGS. 28 and 29), the holder connector 208 is moved to a position before the movable range. Thus, the unlock button 263 is pushed by the pressing portion 264 at the front end of the connector holder 250, thereby unlocking the connector locking mechanism 260 (see FIG. 29).

Then, while the phone actuating roller 231 and the idle roller 232 of the actuating device 230 are brought into contact with the opposite side surfaces of the mobile phone 206, the roller 231 is rotated in the specified direction by the biasing force stored in the biasing device. As a result, the mobile phone 206 is moved forward until it projects from the phone accommodating portion 204 by a specified length.

As is clear from the above, only by releasing the pushing force after pushing the mobile phone 206 into the phone accommodating portion 204, the mobile phone 206 and the connectors 207, 208 are automatically unlocked and the mobile phone 206 advances by a specified length so as to be easily taken out by hand.

In this embodiment, as a construction for positioning the mobile phone 206 when it is inserted to a position near the specified accommodation position, the rails 216 are provided on the inner casing 203 and the engaging grooves 217 are formed in the mobile phone 206. However, engaging grooves may be formed in the inner surfaces of front portions of the opposite side walls of the inner casing 203, whereas projections engageable with these engaging grooves may be provided on front portions of the opposite side surfaces of the mobile phone 206.

Instead of the push-on/push-off type locking mechanism using the heart-shaped cam 222 as in the foregoing embodiment, the phone locking device 220 may include elastically displaceable lock portions and corresponding engaging portions may be provided in corresponding positions of the holder main body 201 and the mobile phone 206, so that the locking portion and the engaging portion are automatically locked when the mobile phone is accommodated. Further, an operable portion which operates in connection with the locking portion may be provided so that the locking portion and the engaging portion can be unlocked by operating the operable portion. The above push-on/push-off type locking mechanism can easily effect unlocking and looks better because the operable portion and the like are not exposed.

As described above, a phone holder of the present invention comprising a holder casing and a holder connector, the phone holder being so constructed as to be commonly used for a plurality of types of mobile phones at least one of which has a different outer configuration and/or the phone side connector arranged in a different position. The holder casing is divided into an inner casing and an outer casing to which the holder connector is fixed. There are also a plurality of types of inner casings corresponding to the respective mobile phones which are selectively and detachably fittable into the outer casing, and have each such an inner configuration as to hold the corresponding mobile phone when the mobile phone is inserted thereinto The position of the inner surface of each inner casing is set such that the phone side connector of the corresponding mobile phone is connectable with the holder connector in an inserted state of the mobile phone.

With this phone holder, by inserting the mobile phone to be used into the inner casing after fitting the selected inner casing corresponding to the mobile phone into the outer casing, the mobile phone can be stably held while being securely guided to the holder connector. In other words, only by an operation of installing the outer casing and the holder connector in a passenger compartment of a vehicle or the like and exchanging the inner casing to be fitted into the outer casing while the outer casing and holder connector are held fixed, the phone holder can immediately meet a change of the mobile phone to be used. The mobile phone can be advantageously detachably and stably held.

The above "such an inner configuration as to hold the corresponding mobile phone" refers to the inner configuration of the inner casing with which the mobile phone can be securely inserted to a degree that it can be stably held in the inner casing almost without any shaking. Accordingly, the invention is not only applicable to the phone holders in which the mobile phone is inserted into the inner casing substantially without leaving any clearance between the mobile phone and the inner casing, but also applicable to those in which only a part of the mobile hone is substantially closely fitted inside the inner casing provided that the mobile phone is stably held inside the inner casing. However, if the inner configuration of the inner casing is set such that the mobile phone is substantially closely fitted inside the inner casing at least in its portion in vicinity of the holder connector, the mobile phone can be more securely and smoothly guided to the holder connector.

The construction for mounting the inner casing into the outer casing and the insertion direction of the mobile phone into the inner casing are not particularly specified, but may be suitably set according the position and state of the holder. However, if each inner casing is configured such that the corresponding mobile phone is inserted along the length thereof; the outer casing is configured such that each inner casing is inserted along the length thereof, and the holder connector is fixed at the back with respect to the insertion direction, the mobile phone can be more stably held by the inner casing and the inner casing can be more stably mounted in the outer casing. Further, operability can be improved since the insertion direction of the mobile phone into the inner casing coincides with that of the inner casing into the outer casing.

In this case, if an opening corresponding to the phone side connector is formed at the back of the inner casing, and a connector casing for containing the holder connector is movably provided at the back of the outer casing in a direction normal to a connection direction of the connectors, such that the connector casing is fitted into the opening as the inner casing is fitted into the outer casing, the outer casing can be made more compact as compared with a case where the outer casing is formed larger in advance and a change in the connector position caused by a model change of the mobile phones can be dealt with only by a change of the inner casing.

If a front end portion of the connector casing is tapered to form a first slanted edge and the edge of the opening is formed into a second slanted edge which has a substantially same angle of inclination as the first slanted edge and is widened toward the front, the connector casing of the outer casing can be properly fitted into the opening of the inner casing when the inner casing is fitted into the outer casing even if the opening and the connector casing are slightly displaced from each other. Specifically, the connector casing is moved by being guided by the contact of the first slanted edge of the connector casing and the second slanted edge of the opening, thereby correcting the displacement to fit the connector casing into the inner casing. Accordingly, when the inner casing is exchanged as a result of a model change of the mobile phone, the inner casing can be completely mounted into the outer casing only by pushing the inner casing into the outer casing without a cumbersome operation of resetting the position of the connector according to a new model.

If the connector casing is supported inside the outer casing via a plurality of elastic support members, a moving diastase of the connector casing when the inner casing is mounted into the outer casing can be shortened on the average by positioning the connector casing substantially in the middle of the outer casing by the elastic forces of the respective elastic support members.

Further, if a projection having a leading end thereof in contact with the back surface of the outer casing is provided on the rear surface of the connector casing, the connector casing can be easily moved by reducing a contact area of the connector casing with the back surface.

Furthermore, if the projection is a rotary member, the connector casing can be quite easily moved by reducing resistance produced during the movement.

If there are further provided a locking device for locking the mobile phone when the mobile phone is inserted to a specified accommodation position inside the inner casing, and unlocking device positioned on the outside of the outer casing for releasing the locked state of the mobile phone by the locking device when a specified force is applied thereto, the mobile phone is accommodated and connected with the connector only by being inserted into the inner casing by a driver of a vehicle or the like. In addition, the mobile phone is locked in the specified accommodation position by the locking device, and the mobile phone and the connector can be securely held accommodated and connected, respectively. Further, if the unlocking device is operated in this state, unlocking is effected, enabling the mobile phone to be taken out.

If there is provided a phone pushing device for biasing the mobile phone in such a direction to be withdrawn from a phone accommodating portion while the mobile phone is accommodated in the specified accommodation position of the phone accommodating position inside the inner casing, the mobile phone is automatically pushed out of the inner casing by the phone pushing device when the locked state is released by the unlocking device. Accordingly, the mobile phone can be easily taken out.

If a tapered portion is provided at the entrance of the inner casing from which the mobile phone is inserted, the mobile phone can be easily inserted into the phone accommodating portion.

Further, if a guide groove corresponding to a projection provided on the mobile phone is so formed as to extend in phone insertion and withdrawal directions in both or either one of the lower and side surfaces of the phone accommodating portion of the inner casing, the mobile phone can be smoothly inserted into the phone accommodating portion while being easily positioned along widthwise and vertical directions.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A phone holder for selectively holding one of a plurality of types of mobile phones having different outer configurations the phone holder comprising:
   a holder connector connectable with a phone side connector of a mobile phone,
   a holder casing including:
      an outer casing;
      a plurality of types of inner casings corresponding to different mobile phones, each being selectively and detachably fittable into the outer casing, and having such an inner configuration as to hold a corresponding mobile phone when the mobile phone is inserted thereinto, and the position of an inner surface of each inner casing being set such that the phone side connector of the corresponding mobile phone is connectable with the holder connector in an inserted state of the mobile phone and the substantial portion of the inner casing is enclosed in the outer casing when the phone side connector of the corresponding mobile phone is connected with the holder connector.

2. A phone holder according to claim 1, wherein the inner surface of the inner casing is configured such that at least a part of the mobile phone is substantially closely fitted inside the inner casing.

3. A phone holder according to claim 2, wherein the inner surface of the inner casing is configured such that the mobile phone is substantially closely fitted inside the inner casing at least in its portion in vicinity of the holder connector.

4. A phone holder according to claim 1, further comprising an engaging device provided in corresponding positions of the outer and inner casings for detachably connecting the outer and inner casings.

5. A phone holder according to claim 1, wherein each inner casing is configured such that the corresponding mobile phone is insertable thereinto along the length thereof, the outer casing is configured such that the inner casings are insertable thereinto along the length thereof, and the holder connector is fixed at the back of the outer casing with respect to an insertion direction.

6. A phone holder according to claim 5, wherein an opening corresponding to the phone side connector is formed at the back of the inner casing, and a connector casing for containing the holder connector is movably provided at the back of the outer casing in a direction normal to a connection direction of the connectors, such that the connector casing is fitted into the opening as the inner casing is fitted into the outer casing.

7. A phone holder according to claim 6, wherein a front end portion of the connector casing is tapered to form a first slanted edge and the edge of the opening is formed into a second slanted edge which has a substantially same angle of inclination as the first slanted edge and is widened toward the front.

8. A phone holder according to claim 6, wherein the connector casing is supported inside the outer casing via a plurality of elastic support members.

9. A phone holder according to claim 6, wherein a projection having a leading end thereof in contact with the back surface of the outer casing is provided on the rear surface of the connector casing.

10. A phone holder according to claim 9, wherein the projection is a rotary member.

11. A phone holder according to claim 1, further comprising a locking device for locking the mobile phone when the mobile phone is inserted to a specified accommodation position inside the inner casing, and unlocking device positioned on the outside of the outer casing for releasing the locked state of the mobile phone by the locking device when a specified force is applied thereto.

12. A phone holder according to claim 11, further comprising a phone pushing device for biasing the mobile phone in such a direction to be withdrawn from a phone accommodating portion while the mobile phone is accommodated in the specified accommodation position of the phone accommodating position inside the inner casing.

13. A phone holder according to claim 1, wherein a tapered portion is provided at the entrance of the inner casing from which the mobile phone is inserted.

14. A phone holder according to claim 1, wherein a guide groove corresponding to a projection provided on the mobile phone is so formed as to extend in phone insertion and withdrawal directions in both or either one of the lower and side surfaces of the phone accommodating portion of the inner casing.

15. A phone holder for selectively holding one of a plurality of types of mobile phones having a phone side connector arranged in a different position, the phone holder comprising:
   a holder connector connectable with a phone side connector of a mobile phone;
   a holder casing including:
      an outer casing;
      a plurality of types of inner casings corresponding to different mobile phones, each being selectively and detachably fittable into the outer casing, and having such an inner configuration as to hold a corresponding mobile phone when the mobile phone is inserted thereinto, and the position of an inner surface of each inner casing being set such that the phone side connector of the corresponding mobile phone is connectable with the holder connector in an inserted state of the mobile phone and the substantial portion of the inner casing is enclosed in the outer casing when the phone side connector of the corresponding mobile phone is connected with the holder connector.

16. A phone holder according to claim 1, wherein the inner casing has a rectangle shape in cross section and substantial area of at least three side surfaces of the inner casing are closely fitted in the outer casing.

17. A phone holder according to claim 1, wherein the inner casing has a rectangle shape in cross section and substantial area of four side surfaces thereof are closely fitted into the outer casing.

18. A phone holder according to claim 1, wherein the inner casing has a rectangle shape in cross section and the inner casing is formed with a guide groove on opposite side walls.

19. A phone holder according to claim 18, wherein a roller is provided on the outer casing such that the outer rim of the roller is allowed to pass through the guide groove formed on the inner casing.

20. A phone holder according to claim 19, further comprising a biasing device for biasing the roller inward of the inner casing through the guide groove provided on the inner casing.

* * * * *